US006954544B2

United States Patent
Jepson et al.

(10) Patent No.: US 6,954,544 B2
(45) Date of Patent: Oct. 11, 2005

(54) VISUAL MOTION ANALYSIS METHOD FOR DETECTING ARBITRARY NUMBERS OF MOVING OBJECTS IN IMAGE SEQUENCES

(75) Inventors: Allan D. Jepson, Oakville (CA); David J. Fleet, Menlo Park, CA (US); Michael J. Black, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 664 days.

(21) Appl. No.: 10/155,815

(22) Filed: May 23, 2002

(65) Prior Publication Data

US 2003/0219146 A1 Nov. 27, 2003

(51) Int. Cl.⁷ .................................................. G06K 9/00
(52) U.S. Cl. ...................................... 382/107; 348/155
(58) Field of Search .............................. 380/100, 103; 382/107.236; 356/23, 27, 483; 348/14.1, 97, 154, 155, 169, 170, 208.1, 208.2, 208.4, 208.13, 208.16, 352, 407.1, 451

(56) References Cited

U.S. PATENT DOCUMENTS

| | | | | | |
|---|---|---|---|---|---|
| 5,920,657 A | * | 7/1999 | Bender et al. | ............... | 382/284 |
| 6,049,619 A | * | 4/2000 | Anandan et al. | ............ | 382/107 |
| 6,404,926 B1 | * | 6/2002 | Miyahara et al. | ........... | 382/232 |
| 6,466,622 B2 | * | 10/2002 | Katata et al. | ............. | 375/240.1 |
| 6,611,268 B1 | * | 8/2003 | Szeliski et al. | ............. | 345/473 |
| 2003/0108220 A1 | | 6/2003 | Jepson et al. | | |

OTHER PUBLICATIONS

A Probabilistic Exclusion Principle for Tracking Multiple Objects, J. MacCormick and A. Blake, Proceedings of the IEEE International Conference on Computer Vision, vol. I, pp. 572–578, Corfu, Greece, Sep. 1999.
"Bayesian Interpolation", D.J.C. MacKay, Neural Computation, 4:415–447, 1991.
"Recognizing Planned, Multi–Person Actioin", S.S. Intille and A.F. Bobick, Computer Vision and Image Understanding, 1(3):1077–3142, 2001.
"Quantitative Probabilities for Image Interpretation", A.D. Jepson and R. Mann, Proceedings of the IEEE International Conference on Computer Vision, vol. II, pp. 1123–1130, Corfu, Greece, Sep. (1999).
H. Tao, H.S. Sawhney, and R. Kumar in "Dynamic Layer Representation with Applications to Tracking", Proc. IEEE Conference on Computer Vision and Pattern Recognition, vol. 2, pp. 134–141, Hilton Head (Jun. 2000).
"Smoothness in Layers: Motion Segmentation Using Non-parametric Mixture Estimation", Y. Weiss, Proceedings of IEEE conference on Computer Vision and Pattern Recognition, pp. 520–526, Puerto Rico, Jun. 1997.

(Continued)

*Primary Examiner*—Kanjibhai Patel
*Assistant Examiner*—Abolfazl Tabatabai
(74) *Attorney, Agent, or Firm*—Bever, Hoffman & Harms, LLP; Patrick T. Bever

(57) ABSTRACT

A visual motion analysis method that uses multiple layered global motion models to both detect and reliably track an arbitrary number of moving objects appearing in image sequences. Each global model includes a background layer and one or more foreground "polybones", each foreground polybone including a parametric shape model, an appearance model, and a motion model describing an associated moving object. Each polybone includes an exclusive spatial support region and a probabilistic boundary region, and is assigned an explicit depth ordering. Multiple global models having different numbers of layers, depth orderings, motions, etc., corresponding to detected objects are generated, refined using, for example, an EM algorithm, and then ranked/compared. Initial guesses for the model parameters are drawn from a proposal distribution over the set of potential (likely) models. Bayesian model selection is used to compare/rank the different models, and models having relatively high posterior probability are retained for subsequent analysis.

46 Claims, 11 Drawing Sheets

OTHER PUBLICATIONS

"Tracking People with Twists and Exponential Maps", C. Bregler and J. Malik., Proc. Computer Vision and Pattern Recognition, CVPR–98, pp. 8–15, Santa Barbara, Jun. 1998.

"Mixture Models for Optical Flow Computation", A. Jepson and M. J. Black, Proceedings of IEEE Conference on Computer Vision and Pattern Recognition, pp. 760–761, New York, Jun. 1993.

"The Design and Use of Steerable Filters", W. Freeman and E. H. Adelson, IEEE Pattern Analysis and Machine Intelligence, 13:891–906, 1991.

"Efficient Region Tracking with Parametric Models of Geometry and Illumination", G. D. Hager and P. N. Belhumeur, IEEE Trans. PAMI, 27(10):1025–1039, 1998.

"Maximum Likelihood from Incomplete Data Via the EM Algorithm", A.P. Dempster, N.M. Laird, and D.B. Rubin, Journal of the Royal Statistical Society Series B, 39:1–38, 1977.

"Computation of Component Image Velocity from Local Phase Information", D. J. Fleet and A. D. Jepson, International Journal of Computer Vision, 5:77–104, 1990.

"Performance of Optical Flow Techniques", J. L. Barron, D. J. Fleet, and S. S. Beauchemin, International Journal of Computer Vision, 12(1):43–77, 1994.

"Condensation—Conditional Density Propagation for Visual Tracking", M. Isard and A. Blake., International Journal of Computer Vision, 29(1):2–28, 1998.

"Estimating the Number of Layers in a Distribution using Bayesian Evidence and MDL", T.F. El–Maraghi, unpublished manuscript (www.cs.toronto.edu/tem/mup.ps), 1998.

"Exploring Qualitative Probabilities for Image Understanding", J. Listgarten . . Master's thesis, Department of Computer Science, University of Toronto, Oct. (2000).

* cited by examiner

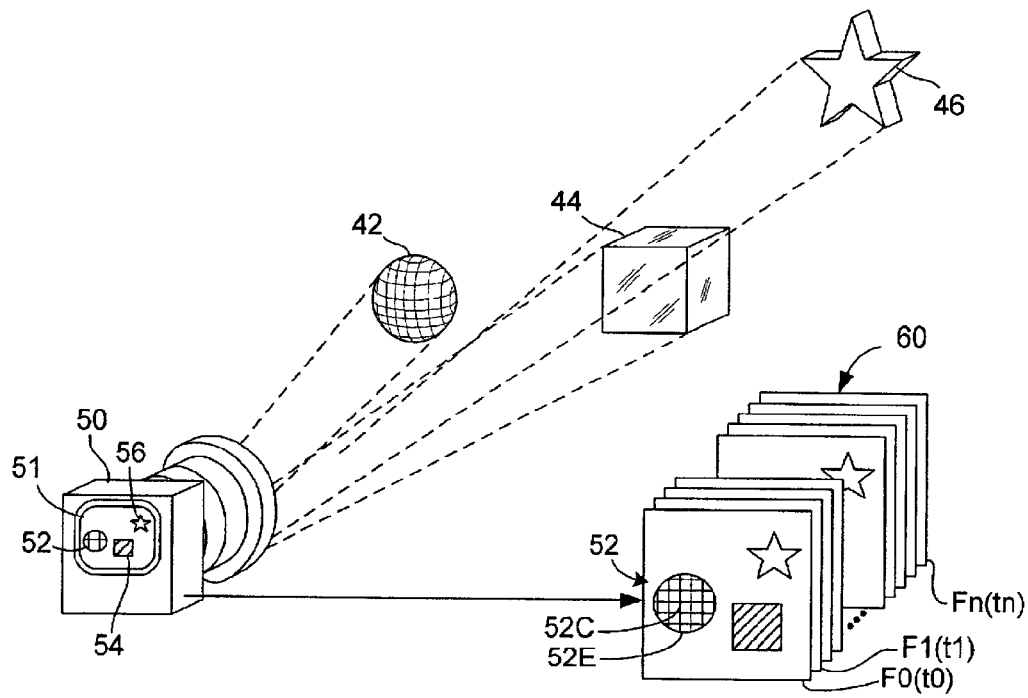
FIG. 1
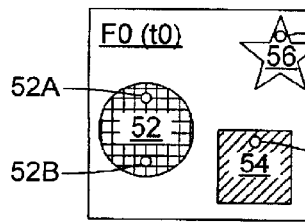 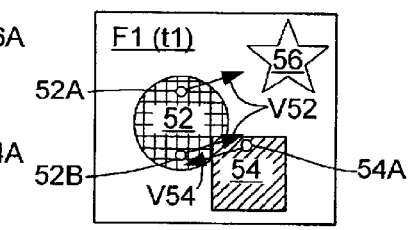 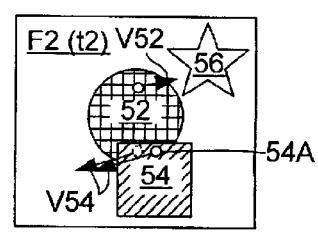
FIG. 2(A)   FIG. 2(B)   FIG. 2(C)
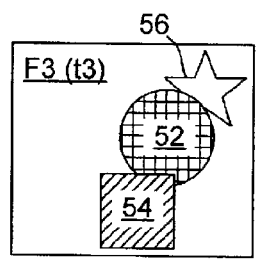 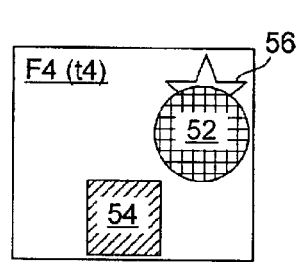
FIG. 2(D)   FIG. 2(E)

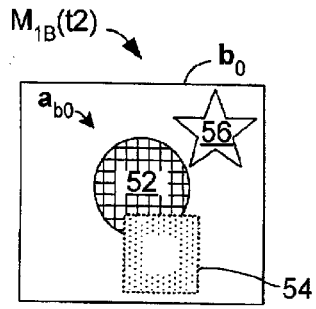 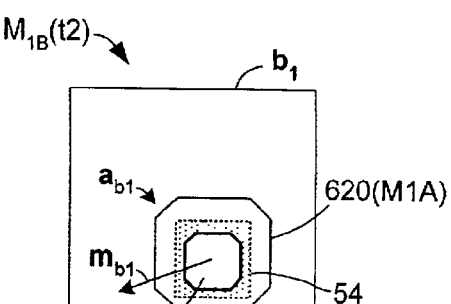 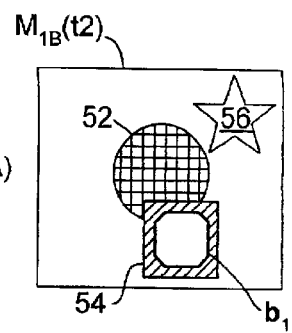
FIG. 13(A)   FIG. 13(B)   FIG. 13(C)
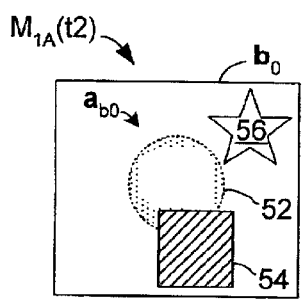 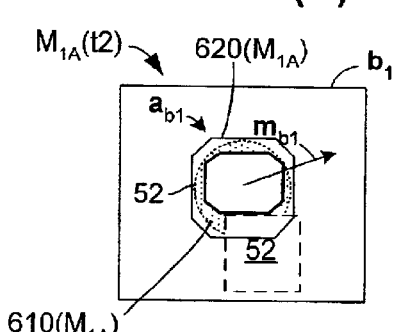 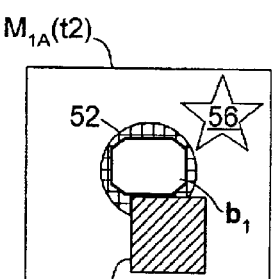
FIG. 14(A)   FIG. 14(B)   FIG. 14C)
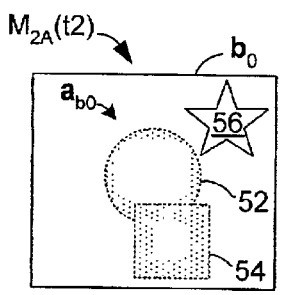 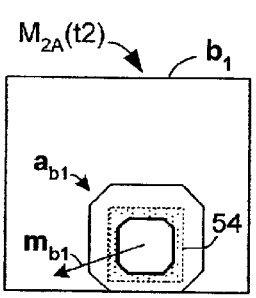 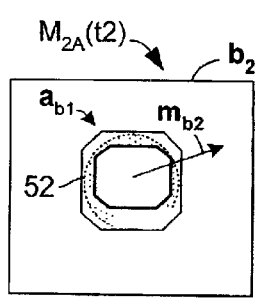 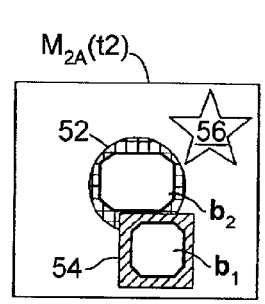
FIG. 15(A)   FIG. 15(B)   FIG. 15C)   FIG. 15(D)
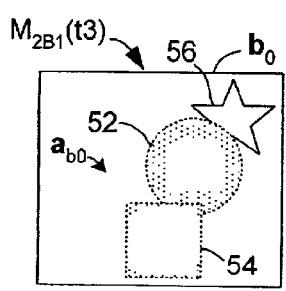 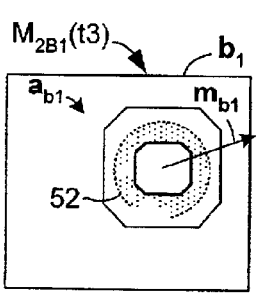 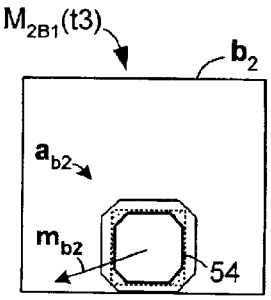 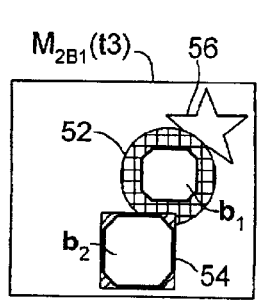
FIG. 16(A)   FIG. 16(B)   FIG. 16C)   FIG. 16(D)

VISUAL MOTION ANALYSIS METHOD FOR DETECTING ARBITRARY NUMBERS OF MOVING OBJECTS IN IMAGE SEQUENCES

FIELD OF THE INVENTION

The present invention relates generally to processor-based visual motion analysis techniques, and, more particularly, to a visual motion analysis method for detecting and tracking arbitrary numbers of moving objects of unspecified size in an image sequence.

BACKGROUND OF THE INVENTION

One goal of visual motion analysis is to compute representations of image motion that allow one to infer the presence, structure, and identity of moving objects in an image sequence. Often, image sequences are depictions of three-dimensional (3D) "real world" events (scenes) that are recorded, for example, by a digital camera (other image sequences might include, for example, infra-red imagery or X-ray images). Such image sequences are typically stored as digital image data such that, when transmitted to a liquid crystal display (LCD) or other suitable playback device, the image sequence generates a series of two-dimensional (2D) image frames that depict the recorded 3D event. Visual motion analysis involves utilizing a computer and associated software to "break apart" the 2D image frames by identifying and isolating portions of the image data associated with moving objects appearing in the image sequence. Once isolated from the remaining image data, the moving objects can be, for example, tracked throughout the image sequence, or manipulated such that the moving objects are, for example, selectively deleted from the image sequence.

In order to obtain a stable description of an arbitrary number of moving objects in an image sequence, it is necessary for a visual motion analysis tool to identify the number and positions of the moving objects at a point in time (i.e., in a particular frame of the image sequence), and then to track the moving objects through the succeeding frames of the image sequence. This process requires detecting regions exhibiting the characteristics of moving objects, determining how many separate moving objects are in each region, determining the shape, size, and appearance of each moving object, and determining how fast and in what direction each object is moving. The process is complicated by objects that are, for example, rigid or deformable, smooth or highly textured, opaque or translucent, Lambertian or specular, active or passive. Further, the depth ordering of the objects must be determined from the 2D image data, and dependencies among the objects, such as the connectedness of articulated bodies, must be accounted for. This process is further complicated by appearance distortions of 3D objects due to rotation, orientation, or size variations resulting from changes in position of the moving object relative to the recording instrument. Accordingly, finding a stable description (i.e., a description that accurately accounts for each of the arbitrary moving objects) from the vast number of possible descriptions that can be generated by the image data can present an intractable computational task, particularly when the visual motion analysis tool is utilized to track objects in real time.

Many current approaches to motion analysis over relatively long image sequences are formulated as model-based tracking problems in which a user provides the number of objects, the appearance of objects, a model for object motion, and perhaps an initial guess about object position. These conventional model-based motion analysis techniques include people trackers for surveillance or human-computer interaction (HCI) applications in which detailed kinematic models of shape and motion are provided, and for which initialization usually must be done manually (see, for example, "Tracking People with Twists and Exponential Maps", C. Bregler and J. Malik., Proc. Computer Vision and Pattern Recognition, CVPR-98, pages 8–15, Santa Barbara, June 1998). Recent success with curve-tracking of human shapes also relies on a user specified model of the desired curve (see, for example, "Condensation—Conditional Density Propagation for Visual Tracking", M. Isard and A. Blake, International Journal of Computer Vision, 29(1):2–28, 1998). For even more complex objects under differing illumination conditions it has been common to learn a model of object appearance from a training set of images prior to tracking (see, for example, "Efficient Region Tracking with Parametric Models of Geometry and Illumination", G. D. Hager and P. N. Belhumeur, IEEE Trans. PAMI, 27(10):1025–1039, 1998). Whether a particular method tracks blobs to detect activities like football plays (see "Recognizing Planned, Multi-Person Action", S. S. Intille and A. F. Bobick, Computer Vision and Image Understanding, 1(3):1077–3142, 2001), or specific classes of objects such as blood cells, satellites or hockey pucks, it is common to constrain the problem with a suitable model of object appearance and dynamics, along with a relatively simple form of data association (see, for example, "A Probabilistic Exclusion Principle for Tracking Multiple Objects, J. MacCormick and A. Blake, Proceedings of the IEEE International Conference on Computer Vision, volume I, pages 572–578, Corfu, Greece, September 1999).

Other conventional visual motion analysis techniques address portions of the analysis process, but in each case fail to both identify an arbitrary number of moving objects, and to track the moving objects in a manner that is both efficient and accounts for occlusions. Current optical flow techniques provide reliable estimates of moving object velocity for smooth textured surfaces (see, for example, "Performance of Optical Flow Techniques", J. L. Barron, D. J. Fleet, and S. S. Beauchemin, International Journal of Computer Vision, 12(1):43–77, 1994), but do not readily identify the moving objects of interest for generic scenes. Layered image representations provide a natural way to describe different image regions moving with different velocities (see, for example, "Mixture Models for Optical Flow Computation", A. Jepson and M. J. Black, Proceedings of IEEE Conference on Computer Vision and Pattern Recognition, pages 760–761, New York, June 1993), and they have been effective for separating foreground objects from backgrounds. However, in most approaches to layered motion analysis, the assignment of pixels to layers is done independently at each pixel, without an explicit model of spatial coherence (although see "Smoothness in Layers: Motion Segmentation Using Nonparametric Mixture Estimation", Y. Weiss, Proceedings of IEEE conference on Computer Vision and Pattern Recognition, pages 520–526, Puerto Rico, June 1997). By contrast, in most natural scenes of interest the moving objects occupy compact regions of space.

Another approach taught by H. Tao, H. S. Sawhney, and R. Kumar in "Dynamic Layer Representation with Applications to Tracking", Proc. IEEE Conference on Computer Vision and Pattern Recognition, Volume 2, pages 134–141, Hilton Head (June 2000), which is referred to herein as "Gaussian method", addresses the analysis of multiple moving image regions utilizing a relatively simple parametric model for the spatial occupancy (support) of each layer.

However, the spatial support of the parametric models used in the Gaussian method decays exponentially from the center of the object, and therefore fails to encourage the spatiotemporal coherence intrinsic to most objects (i.e., these parametric models do not represent region boundaries, and they do not explicitly represent and allow the estimation of relative depths). Accordingly, the Gaussian method fails to address occlusions (i.e., objects at different depths along a single line of sight will occlude one another). Without taking occlusion into account in an explicit fashion, motion analysis falls short of the expressiveness needed to separate changes in object size and shape from uncertainty regarding the boundary location. Moreover, by not addressing occlusions, data association can be a significant problem when tracking multiple objects in close proximity, such as the parts of an articulated body.

What is needed is an efficient visual image analysis method for detecting an arbitrary number of moving things in an image sequence, and for reliably tracking the moving objects throughout the image sequence even when they occlude one another. In particular, what is needed is a compositional layered motion model with a moderate level of generic expressiveness that allows the analysis method to move from pixels to objects within an expressive framework that can resolve salient motion events of interest, and detect regularities in space-time that can be used to initialize models, such as a 3D person model. What is also needed is a class of representations that capture the salient structure of the time-varying image in an efficient way, and facilitate the generation and comparison of different explanations of the image sequence, and a method for detecting best-available models for image processing functions.

SUMMARY OF THE INVENTION

The present invention is directed to a tractable visual motion analysis method that both detects and reliably tracks an arbitrary number of moving objects appearing in an image sequence by continuously generating, refining, and ranking compositional layered "global" motion models that provide plausible global interpretations of the moving objects. Each layered global model is a simplified representation of the image sequence that includes a background layer and one or more foreground components, referred to herein as "polybones", with each polybone being assigned an associated moving object of the image sequence (i.e., to a region of the image sequence exhibiting characteristics of a moving object). The background layer includes an optional motion vector, which is used to account for camera movement, and appearance data depicting background portions of the image sequence (along with any moving objects that are not assigned to a polybone, as described below). Each foreground polybone is assigned an explicit depth order relative to other polybones (if any) in a particular global model, and is defined by "internal" parameters associated with a corresponding motion and appearance models (i.e., parameters that do not change the region occupied by the polybone) and "pose" parameters (i.e., parameters that define the shape, size, and position of the region occupied by the polybone). In effect, each layered global model provides a relatively straightforward 2.5D layered interpretation of the image sequence, much like a collection of cardboard cutouts (i.e., the polybones) moving over a flat background scene, with occlusions between the polybones being determined by the explicit depth ordering of the polybones. Accordingly, the layered motion models utilized in the present invention provide a simplified representation of the image sequence that facilitates the analysis of multiple alternative models using minimal computational resources.

In accordance with an aspect of the present invention, the "pose" parameters of each polybone define an exclusive spatial support region surrounded by a probabilistic boundary region, thereby greatly simplifying the image analysis process while providing a better interpretation of the natural world depicted in an image sequence. That is, most physical objects appearing in an image sequence are opaque, and this opacity extends over the entire space occupied by the object in the image sequence. In contrast, the exact position of object's boundary (edge) is typically more difficult to determine when the object includes an uneven surface (e.g., when the object is covered by a fuzzy sweater or moving quickly, which causes image blur, or when image quality is low) than when the object has a smooth surface (e.g., a metal coat and a sharp image). To account for these image characteristics in modeling a moving object, the exclusive spatial support region of each polybone is positioned inside the image space occupied by its assigned moving object, while the probabilistic boundary region surrounds the exclusive spatial support region, and is sized to account for the degree of uncertainty regarding the actual edge location of the object. In one embodiment, the exclusive spatial support region has a closed polygonal shape (e.g., an octagon) whose peripheral boundary is positioned inside of the perceived edge of the associated moving object, and this exclusive spatial support region is treated as fully occupied by the polybone/object when calculating occlusions (which also takes into account the assigned depth ordering). An advantage of assuming the space occupied by a polybone fully occludes all objects located behind that polybone is that this assumption, more often than not, best describes the 3D event depicted in the image sequence. Further, this assumption simplifies the calculations associated with the visual motion analysis method because points located inside an object's exclusive spatial support region are not used to calculate the motion or appearance of another object occluded by this region. That is, unlike purely Gaussian methods in which pixels located near two objects are always used to calculate the motion/ appearance of both objects, pixels located inside the exclusive spatial support region of a polybone assigned to one object are not used in the motion/appearance calculations of nearby objects. In contrast to the exclusive ownership of pixels located in the spatial support region, pixels located in the probabilistic boundary region of each polybone can be "shared" with other objects in a manner similar to that used in the Gaussian methods. That is, in contrast to the relatively high certainty that occlusion takes place in central region of an object's image, occlusion is harder to determine adjacent to the object's edge (i.e., in the probabilistic boundary region). For example, when the moving object image is blurred (i.e., the edge image is jagged and uneven), or when the image sequence provides poor contrast between the background scene and the moving object, then the actual edge location is difficult to ascertain (i.e., relatively uncertain). Conversely, when the moving object is sharply defined and the background scene provides excellent contrast (e.g., a black object in front of a white background), then the actual edge location can be accurately determined from the image data. To accurately reflect the uncertainty associated with the edge location of each object, the boundary location of each polybone is expressed using a probability function, and spatial occupancy decays at points located increasingly farther from the interior spatial support region (e.g., from unity inside the polygon to zero far from the image edge). Therefore, unlike Gaussian modeling methods, the polybone-based global model utilized in the present invention provides a representation of image motion that facilitates more accurate inference of the presence, structure, and identity of moving objects in an image sequence, and facilitates the analysis of occlusions in a more practical and efficient manner.

As mentioned above, there is no practical approach for performing the exhaustive search needed to generate and analyze all possible models in order to identify an optimal model describing an image sequence having an arbitrary number of moving objects. According to another aspect of the present invention, the visual motion analysis method addresses this problem by generating plausible layered motion models from a proposal distribution (i.e., based on various possible interpretations of the image data), refining the motion model parameters to "fit" the current image data, ranking the thus-generated motion models according to which models best describe the actual image data (i.e., the motion models that are consistent with or compare well with the image data), and then eliminating (deleting) inferior motion models. The number of plausible layered motion models that are retained in the thus-formed model framework is determined in part on the computational resources available to perform the visual motion analysis method. It is generally understood that the larger the number of retained motion models, the more likely one of the motion models will provide an optimal (or near-optimal) representation of the image sequence. On the other hand, retaining a relatively large number of motion models places a relatively high burden on the computational resources. Accordingly, when the motion models in the model framework exceed a predetermined number (or another trigger point is reached), motion models that rank relatively low are deleted to maintain the number of models in the model framework at the predetermined number, thereby reducing the burden on the computational resources. The highest-ranking model at each point in time is then utilized to perform the desired visual motion analysis function.

According to another aspect of the present invention, the targeted heuristic search utilized by the visual motion analysis method generates the model framework in a manner that produces multiple layered motion models having different numbers of foreground components (polybones), depth orderings, and/or other parameters (e.g., size, location of the polybones). The model framework initially starts with a first generation (core) model that includes zero foreground polybones, and is used to periodically (e.g., each n number of frames) spawn global models having one or more foreground polybones. The core model compares two or more image frames, and identifies potential moving objects by detecting image regions that include relatively high numbers of outliers (i.e., image data that is inconsistent with the current background image). In one embodiment, a polybone is randomly assigned to one of these outlier regions, and a next-generation motion model is generated (spawned) that includes a background layer and the newly formed foreground polybone. Each next-generation motion model subsequently spawns further generation global models in a similar fashion. In particular, the background layer of each next generation global model (i.e., omitting the already assigned moving object region) is searched for potential moving objects, and polybones are assigned to these detected outlier regions. As mentioned above, to prevent overwhelming the computational resources with the inevitable explosion of global models that this process generates, the global models are ranked (compared), and low ranking global models are deleted. In this manner, a model framework is generated that includes multiple layered global models, each global model being different from the remaining models either in the number of polybones utilized to describe the image, or, when two or more models have the same number of polybones, in the depth ordering or other parameter (e.g., size, location) of the polybones. By generating the multiple layered global models from a core model in this manner, the model framework continuously adjusts to image sequence changes (e.g., objects moving into or out of the depicted scene), thereby providing a tractable visual motion analysis tool for identifying and tracking an arbitrary number of moving objects.

In accordance with yet another aspect of the present invention, the shape, motion, and appearance parameters of the background layer and each foreground polybone are continuously updated (refined) using a gradient-based search technique to optimize the parameters to the image data. In one embodiment, each newly-spawned foreground polybone is provided with initial parameters (e.g., a predetermined size and shape) that are subsequently refined using, for example, an Expectation-Maximization (EM) algorithm until the exclusive spatial support region of each polybone closely approximates its associated moving object in the manner described above. In one embodiment, the initial parameters of each polybone are continuously adjusted (optimized) to fit the associated moving object by differentiating a likelihood function with respect to the pose parameters (e.g., size) to see how much a change in the parameter will affect a fitness value associated with that parameter. If the change improves the fitness value, then the parameter is increased in the direction producing the best fit. In one embodiment, an analytic ("hill climbing") method is used to determine whether a particular change improves the likelihood value. In particular, given a current set of parameters associated with a polybone, an image is synthesized that is compared against the current image frame to see how well the current parameter set explains the image data. In one embodiment, a constraint is placed on the refinement process that prevents the parameters from changing too rapidly (e.g., such that the size of the polybone changes smoothly over the course of several frames). With each successive frame, the polybone parameters are analyzed to determine how well they explain or predict the next image frame, and refined to the extent necessary (i.e., within the established constraints) until each parameter value is at a local extrema (i.e., maximally approximates or matches the corresponding image data).

In accordance with yet another aspect of the present invention, global model ranking is performed using a Bayesian model selection criterion that determines the fit of each polybone parameter to the image data. In one embodiment, the ranking process utilizes a likelihood function that penalizes model complexity (i.e., a preference for global models that have a relatively low number of polybones), and penalizes global models in which the parameters change relatively quickly (i.e., is biased to prefer smooth and slow parameter changes). Typically, the more complex a global model is, the more likely that global model will "fit" the image data well. However, relatively complex models tend to model noise and irrelevant details in the image data, hence the preference of simpler models, unless fitness significantly improves in the complex models. Further, due to the ever-changing number, position, and appearance of moving objects in a generic image sequence (i.e., an image sequence in which objects randomly move into and out of a scene), a relatively complex model that accurately describes a first series of frames having many objects may poorly describe a subsequent series of frames in which many of those objects move out of the scene (or are otherwise occluded). Biasing the ranking process to retain relatively less complex motion models addresses this problem by providing descriptions suitable for accurately describing the disappearance of moving objects.

BRIEF DESCRIPTION OF THE DRAWINGS

FIG. 1 is a perspective view depicting a simplified 3D "real world" event according to a simplified example utilized in the description of the present invention;

FIGS. 2(A) through 2(E) are simplified diagrams illustrating five image frames of an image sequence associated with the 3D event shown in FIG. 1;

FIGS. 13(A), 13(B) and 13(C) are simplified diagrams depicting a background layer, a foreground polybone, and a combined global model, respectively, associated with yet another model of the simplified example shown in FIG. 9;

FIGS. 14(A), 14(B) and 14(C) are simplified diagrams depicting a background layer, a foreground polybone, and a combined global model, respectively, associated with yet another model of the simplified example shown in FIG. 9;

FIGS. 15(A), 15(B), 15(C) and 15(D) are simplified diagrams depicting a background layer, a first foreground polybone, a second foreground polybone, and a combined global model, respectively, associated with yet another model of the simplified example shown in FIG. 9;

FIGS. 16(A), 16(B), 16(C) and 16(D) are simplified diagrams depicting a background layer, a first foreground polybone, a second foreground polybone, and a combined global model, respectively, associated with yet another model of the simplified example shown in FIG. 9;

DETAILED DESCRIPTION

Figure 3:
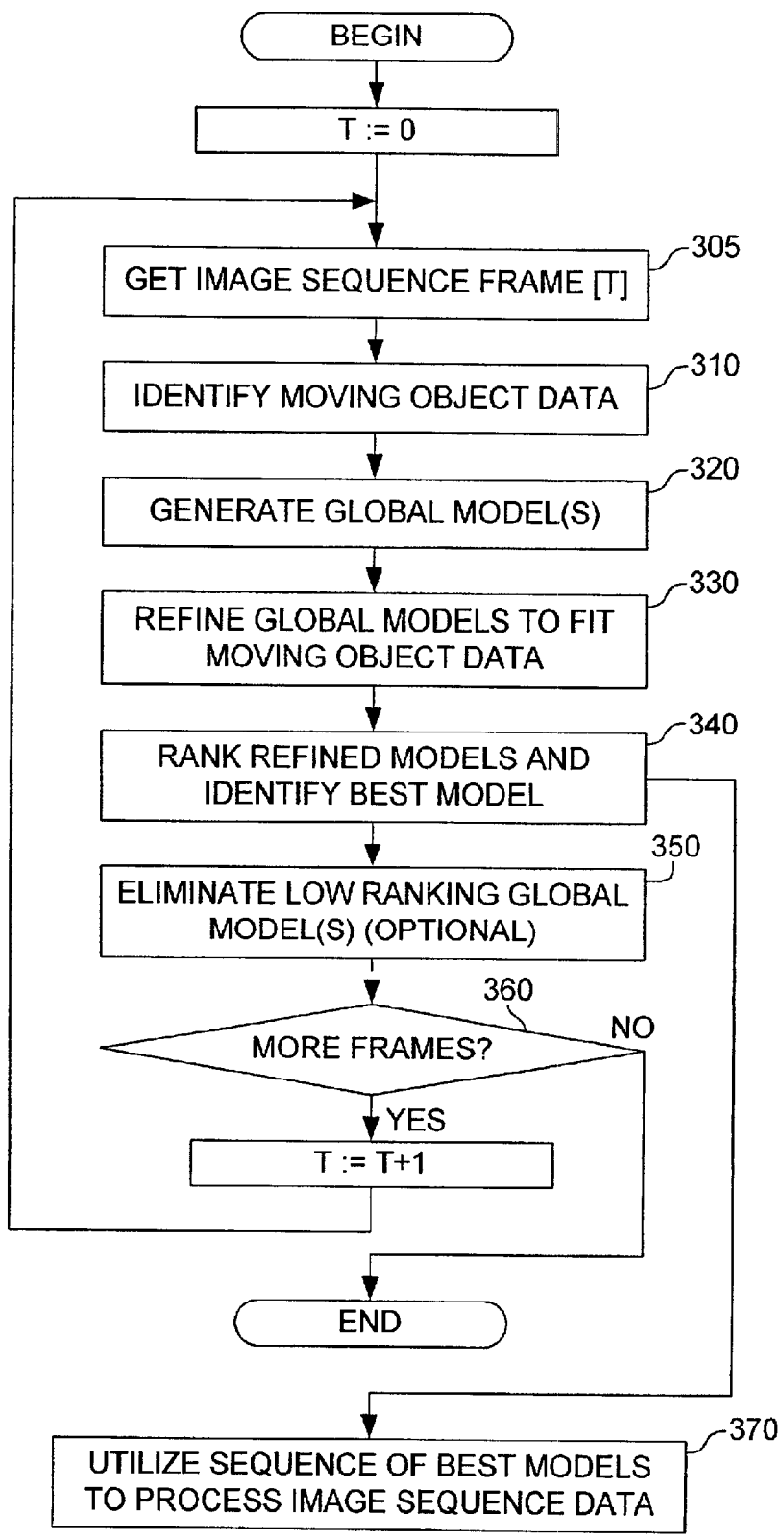
FIG. 3 is a flow diagram of the visual motion analysis method according to a simplified embodiment of the present invention.

The present invention is directed to a visual motion analysis method in which a layered motion model framework is generated and updated by a computer or workstation, and is defined by parameters that are stored in one or more memory devices that are readable by the computer/workstation. The visual motion analysis method is described below in conjunction with a tracking function to illustrate how the beneficial features of the present invention facilitate motion-based tracking or surveillance of an arbitrary number of moving objects during "real world" events. However, although described in the context of a tracking system for "real world" events, the visual motion analysis method of the present invention is not limited to this function, and may be utilized for other purposes. For example, the visual motion analysis method can also be utilized to perform image editing (e.g., remove or replace one or more moving objects from an image sequence), or to perform object recognition. Further, the visual motion analysis method of the present invention can be used to analyze infra-red or X-ray image sequences. Therefore, the appended claims should not be construed as limiting the visual motion analysis method of the present invention to "real world" tracking systems unless such limitations are specifically recited.

FIG. 1 is a perspective view depicting a simplified 3D "real world" event in which the relative position of several simple 3D objects (i.e., a sphere 40, a cube 42, and a star 44) changes over time due to the movement of one or more of the objects. This 3D event is captured by a digital camera (recording instrument) 50 as an image sequence 60, which includes image data stored as a series of image frames F0 (i.e., a still image captured at time t0) through Fn (captured at a time tn). This image data is stored such that, when transmitted to a liquid crystal display (LCD) or other suitable playback device, the image data of each frame F0 through Fn generates a 2D image region representing the 3D event at an associated point in time. For example, indicated on a display 51 of camera 50, the 2D image includes a 2D circle (image region) 52 depicting a visible portion of 3D sphere 42, a 2D square 54 depicting a visible portion of 3D cube 44, and a 2D star 56 depicting a visible portion of 3D star 46. As indicated on frame F0, each image region (e.g., circle 52) includes a central region (e.g., region 52C) and an outer edge region (e.g., region 52E) surrounding the central region. When displayed sequentially and at an appropriate rate (e.g., 30 frames per second), the images generated by the series of frames F0 through Fn collectively depict the 3D event. Note that, for simplicity in the following description, the 3D objects (i.e., sphere 42, cube 44, and star 46) are assumed to maintain a fixed orientation relative to camera 50, and are therefore not subject to distortions usually associated with the movement of complex 3D moving objects.

FIGS. 2(A) through 2(E) illustrate five frames, F0 through F4, of an image sequence that are respectively recorded at sequential moments t0 through t4. Frame F0 through F4, which comprise image data recorded as described above, are utilized in the following discussion. Note that frames F0 through F4 show circle 52, square 54, and star in five separate arrangements that indicate relative movement over time period t0 through t4. In particular, FIG. 2(A) shows a depiction of image data associated with F0 (time t0) in which the three objects are separated. In frame F1 (time t1), which is shown in FIG. 2(B), circle 52 has moved to the right and upward, and square 54 has moved to the left and slightly downward. Note that the upper left corner of square 54 occludes a portion of circle 52 in frame F1. Note also that star 56 remains stationary throughout the entire image sequence. In frame F2 (time t2, FIG. 2(C)), circle 52 has moved further upward and to the right, and square 54 has moved further downward and to the left, causing the upper portion of square 54 to occlude a larger portion of the circle 52. In frame F3 (time t3, FIG. 2(D)), circle 52 has moved yet further upward and to the right such that it now occludes a portion of star 56, and square 54 has moved further downward and to the left such that only its right upper corner overlaps a portion of circle 52. Finally, in frame F4 (time t4, FIG. 2(E)), circle 52 has moved yet further upward and to the right such that it now occludes a significant portion of star 56, and square 54 has moved further downward and to the left such that it is now separated from circle 52.

As mentioned above, to obtain a stable description of an arbitrary number of moving objects in an image sequence, it is necessary to identify the number and positions of the moving objects at a point in time (i.e., in a particular frame of the image sequence), and then to track the moving objects through the succeeding frames of the image sequence. This process is performed, for example, by identifying regions of the image that "move" (change relative to a stable background image) in a consistent manner, thereby indicating the presence of an object occupying a compact region of space. For example, referring again to FIGS. 2(A) and 2(B), points (i.e., pixels) 52A and 52B associated with the central region of circle 52 appear to move generally in the same direction and at the same velocity (indicated by arrow V52, thereby indicating that these points are associated with a single object. Similarly, points, such as point 54A associated with square 54 move generally as indicated by arrow V54, and point associated with star 56 remain in the same location throughout the image sequence.

An optimal solution of the first problem (i.e., identifying an arbitrary number of moving objects, each having an arbitrary size) is essentially intractable due to the very large number of possible explanations for each frame of an image sequence. That is, each point (pixel) of each image frame represents a potential independent moving object, so circle 52 (see FIG. 2(A)) can be described as thousands of tiny (i.e., single pixel) objects, or dozens of larger (i.e., several pixel) objects, or one large object. Further, an optimal solution would require analyzing every point (pixel) of each image frame (e.g., points located outside of circuit 52) to determine whether those points are included in the representation of a particular object. Therefore, as described above, conventional motion analysis methods typically require a user to manually identify regions of interest, or to identify the number and size of the objects to be tracked, thereby reducing the computational requirements of the identification process.

However, even when the number and size of moving objects in an image sequence are accurately identified, tracking these objects is difficult when one object becomes occluded by another object. In general, the task of tracking an object (e.g., circle 52, as shown in FIGS. 2(A) and 2(B)) involves measuring the motion of each point "owned by" (i.e., associated with the representation of) that object in order to anticipate where the object will be located in a subsequent frame, and then comparing the anticipated location with the actual location in that next frame. For example, when anticipating the position of circle 52 in FIG. 2(C), the movement of points 52A and 52B is measured from image data provided in FIGS. 2(A) and 2(B) (indicated by motion vector V52), and the measured direction and distance moved is then used to calculate the anticipated position of circle 52 in FIG. 2(C). This process typically involves, at each frame, updating both the anticipated motion and an appearance model associated with the object, which is used to identify the object's actual location. When a portion of an object becomes occluded, the measurement taken from that portion can skew the anticipated object motion calculation and/or cause a tracking failure due to the sudden change in the object's appearance. For example, as indicated in FIG. 2(C), when the lower portion of circle 52 including point 52B becomes occluded, measurements taken from the point previously associated with point 52B (which are actually part of square 54) would generate erroneous data with respect to the motion of circle 52. Further, the appearance model (i.e., a complete circle) for circle 52, which is generated from image data occurring up to FIG. 2(A), no longer accurately describes the partial circle appearing in FIG. 2(C), thereby potentially causing the tracking operation to "lose track of" circle 52.

FIG. 3 is a flow diagram showing a simplified visual motion analysis method according to the present invention that facilitates both detecting and reliably tracking an arbitrary number of moving objects appearing in an image sequence. Upon receiving image data associated with an initial frame (block 305), the visual motion analysis method begins by identifying potential moving objects appearing in the image sequence (block 310), and generating a model framework including multiple layered "global" motion models according to a heuristic search method, each global motion model being based on a plausible interpretation of the image data (block 320). Each global motion includes a background layer and one or more foreground components, referred to herein as "polybones", each polybone having shape, position, motion, and appearance parameters that model an associated moving object of the image sequence (or to a region of the image sequence exhibiting characteristics of a moving object) that is identified in block 310. The polybones of each global model are assigned an initial placement and depth ordering that is determined according to the heuristic search method. Further description of the global motion models, polybones, and examples of the heuristic search method are provided in the following discussion. The global motion models are then subjected to a refining process (block 330) during which the shape, position, motion, and appearance parameters associated with each polybone are updated to "fit" the current image data (i.e., the image data of the most recently analyzed image frame). Details regarding the refining process are also provided in the following discussion. After the refining process is performed, the global models are ranked (compared) to determine which of the heuristically-generated global models best describe the image data (block 340). Next, to maintain a tractable number of global models, low ranking models are eliminated (deleted) from the model framework (block 350), and then the process is repeated for additional frames (block 360). As indicated at the bottom of FIG. 3, a sequence of best global model (i.e., the global models that most accurately matches the image data at each point in time or each frame) is thereby generated (block 370). This sequence of best global models is then utilized to perform tracking operations (or other motion analysis function) established methods.

Global Motion Models

The main building blocks of the visual motion analysis method of the present invention are the global motion models (also referred to herein as "global models"). Each layered global motion model consists of a background layer and K depth-ordered foreground polybones. Formally, a global model M at time t can be written as $$M = (K(t), b_0(t), \ldots, b_K(t)), \quad (1)$$

where $b_k$ is the parameter vector for the $k^{th}$ polybone. As discussed below, the parameters $b_k$ of a single polybone specify its shape, position and orientation, along with its image motion and appearance. By convention, the depth ordering is represented by the order of the polybone indices, so that the background layer corresponds to k=0, and the foremost foreground polybone to k=K. As discussed in additional detail below, the foreground polybones are defined to have local spatial support. Moreover, nearby polybones can overlap in space and occlude one another, so depth ordering must be specified. Accordingly, the form of the spatial support and the parameterized shape model for individual polybones must be specified. Then, given size, shape, location and depth ordering, visibility is formulated (i.e., which polybones are visible at each pixel).

Figure 4:
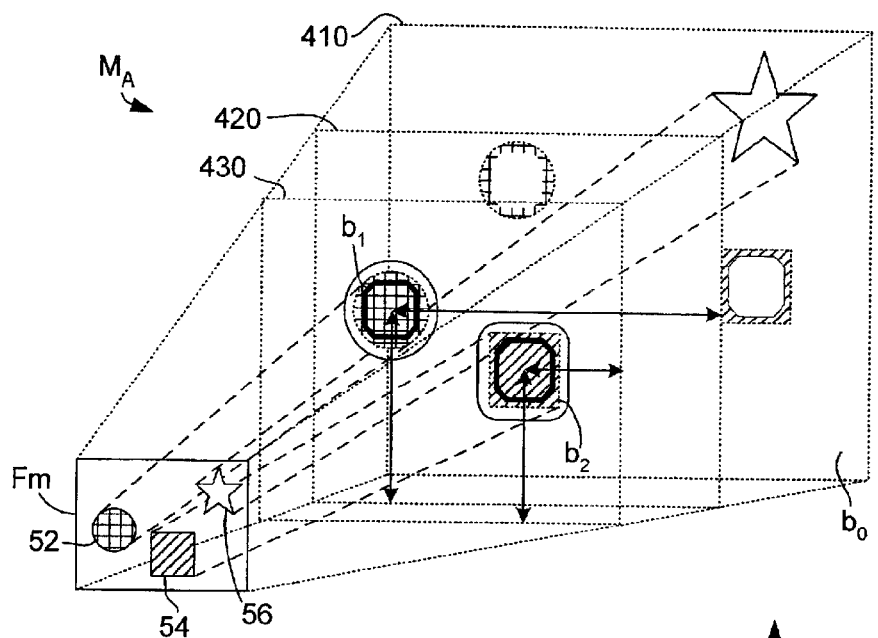
FIG. 4 is a perspective graphical representation of an exemplary layered global motion model according to an embodiment of the present invention.
Figure 5:
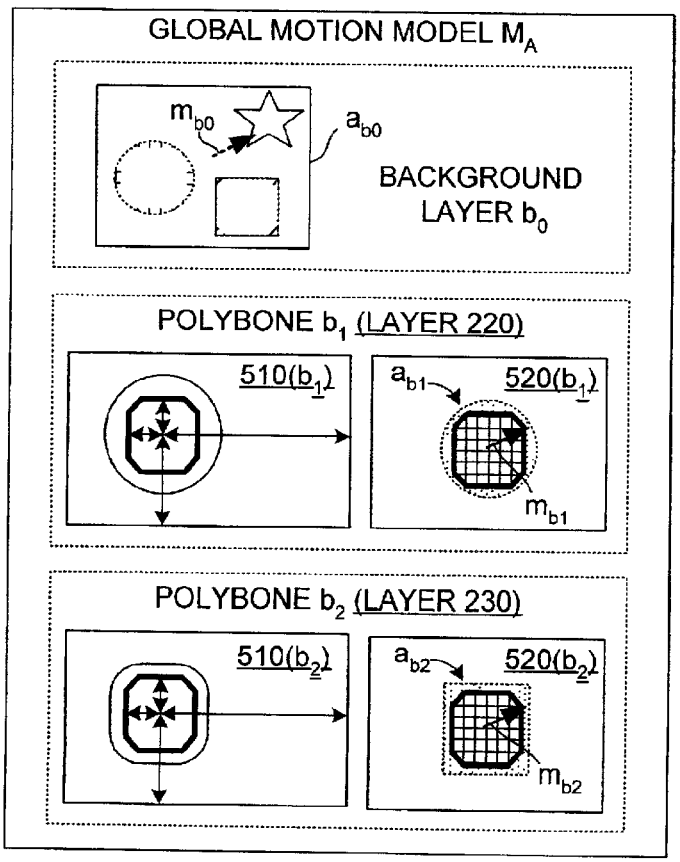
FIG. 5 is a table diagram representation of the exemplary layered global motion model shown in FIG. 4.

FIGS. 4 and 5 are perspective graphical and table diagram representations, respectively, of an exemplary layered global model $M_A$ according to an embodiment of the present invention. As depicted in FIG. 4, global model $M_A$ generally represents the image sequence introduced above at an arbitrary frame Fm, and the present example assumes circle 52 and square 54 are moving in the image sequence as described above (star 56 is stationary). Model $M_A$ includes a background layer $b_0$, and two foreground polybones: polybone $b_1$, which is assigned to circle 52, and polybone $b_2$, which is assigned to square 54.

Referring to the upper portion of the table shown in FIG. 5, background layer $b_0$ includes appearance data (parameters) $a_{b0}$ associated with relatively stationary portions of the image data (e.g., star 56), and also includes portions of image data associated moving objects that are not exclusively assigned to a polybone (described further below). Background layer $b_0$ also includes an optional motion parameter (vector) $m_{b0}$, which is used to represent movement of the background in the image resulting, for example, from movement of the recording instrument.

As depicted in FIG. 4, background layer $b_0$ and polybones $b_1$ and $b_2$ have an explicit depth order in model $M_A$. As indicated in FIG. 4, background layer $b_0$ is always assigned an explicit depth ordering (i.e., layer 410) that is "behind" all foreground polybones (e.g., polybones $b_1$ and $b_2$). In this example, polybone $b_1$ is assigned to an intermediate layer 420, and polybone $b_2$ is assigned to a foremost layer 430. As described below, the spatial support provided by each polybone, along with the depth ordering graphically represented in FIG. 4, is utilized to determine visibility and occlusion during the refinement and ranking of model $M_A$. In effect, layered model $M_A$ provides a relatively straightforward 2.5D layered interpretation of the image sequence, much like a collection of cardboard cutouts (i.e., polybones $b_1$ and $b_2$) moving over a flat background scene $b_0$, with occlusions between the polybones being determined by the explicit depth ordering and the size/shape of the spatial support regions of the polybones.

Each polybone $b_1$ and $b_2$ is defined by pose parameters (i.e., parameters that define the shape, size, and position of the region occupied by the polybone) and internal parameters (i.e., parameters that do not change polybone occupancy, such as motion and appearance model parameters). Referring to FIG. 5, polybone $b_1$ includes pose parameters 510($b_1$) and internal parameters 520($b_1$), and polybone $b_2$ includes pose parameters 510($b_2$) and internal parameters 520($b_2$). The pose parameters and their influence on spatial occupancy are described below with reference to FIG. 6. The internal parameters are utilized to estimate object motion and during the refining and ranking operations, and are described in further detail below.

Polybone Shape

Figure 6:
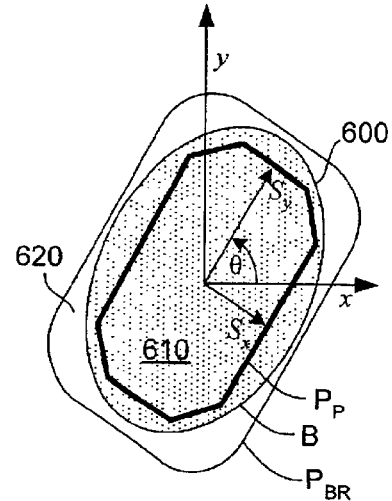
FIG. 6 is a diagram illustrating pose parameters for an exemplary polybone according to an embodiment of the present invention.

FIG. 6 illustrates pose parameters for an exemplary polybone $b_k$ that is shown superimposed over an oval moving object 600. Polybone $b_k$ includes an exclusive spatial support (occupancy) region 610 defined by a simple closed polygon $P_P$, and a boundary region ("ribbon") 620 located outside of exclusive spatial support region 610 and bounded by a perimeter $P_{BR}$. In the present embodiment, the simple closed polygon $P_P$ is an octagon that provides an polybone-centric frame of reference that defines the appearance portion of object 600 exclusively "owned" by polybone $b_k$. In contrast, boundary region 620 represents a parametric form of spatial uncertainty representing a probability distribution over the true location of the region boundary (i.e., a region in which the actual boundary (edge) of the associated moving object is believed to exist). Parametric boundary region 620 facilitates a simple notation of spatial occupancy that is differentiable, and allows the representation of a wide variety of shapes with relatively simple models. Although in the following discussion the closed polygonal shape is restricted to octagons, any other closed polygonal shape may be utilized to define the exclusive spatial occupancy region 610 and a probabilistically determined ("soft") boundary region 620.

The pose parameters of polybone $b_k$ are further described with reference to FIG. 6. With respect to the local coordinate frame, the shape and pose of the polybone is parameterized with its scale in the horizontal and vertical directions $s=(s_x, s_y)$, its orientation about its center $\theta$, and the position of its center in the image plane $c=(c_x, c_y)$. In addition, uncertainty in the boundary region 620 is specified by $\sigma_s$. This simple model of shape and pose was selected to simplify the exposition herein and to facilitate the parameter estimation problem discussed below. However, it is straightforward to replace the simple polygonal shape (i.e., octagon) with a more complex polygonal model, or to use, for example, a spline-based shape model, or shapes defined by harmonic bases such as sinusoidal Fourier components, or shapes defined by level-sets of implicit polynomial functions.

The pose (shape) parameters $(s_k, \theta_k, c_k, \sigma_{s,k})$ and internal parameters $(m_k$ and $a_k)$ for polybone $b_k$ are collectively represented by equation (2):

$$b_k = (s_k, \theta_k, c_k, \sigma_{s,k}, a_k, m_k) \quad (2)$$

Figure 7A:
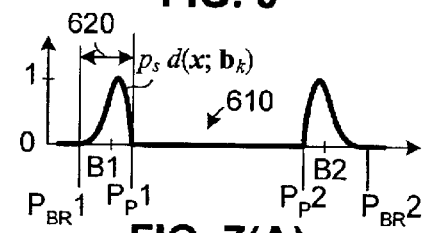
FIGS. 7(A) and 7(B) are graphs depicting a probability density and occupancy probabilities, respectively, for the polybone illustrated in FIG. 6.

According to an aspect of the present invention, the boundary region 620 defined by each polybone provides a probabilistic treatment for the object boundary (i.e., the edge of the image region associated with the object). Given the simplicity of the basic shapes used to define the polybones, it is not expected that they accurately fit any particular object's shape extremely well (e.g., as indicated in FIG. 6, the boundary (edge) B of object 600 is located entirely outside of spatial support region 610). Therefore, it is important to explicitly account for uncertainty of the location of the true region boundary in the neighborhood of the polygon. Accordingly, let $p_s$ be the probability density of the true object boundary, conditioned on the location of the polygon. More precisely, this density is expressed as a function of the distance, $d(x; b_k)$, from a given location x to the polygon boundary specified by the polybone parameters $b_k$. FIG. 7(A) illustrates the form of $p_s$ $(d(x; b_k))$, which indicates the probability the location of the true object boundaries B1 and B2, which represent opposite sides of object 600 (see FIG. 6). Note that the probability density $p_s$ $(d(x; b_k))$ defines boundary region 620.

Figure 7B:
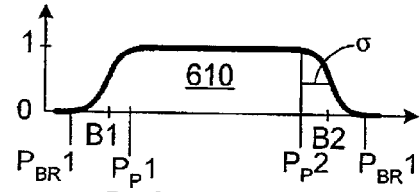

A quantity of interest that is related to the boundary probability is the occupancy probability, denoted $w(x; b_k)$ for the $k^{th}$ polybone. The occupancy probability is the probability that point x lies inside the true boundary B, and it serves as a notion of probabilistic support from which the notions of visibility and occlusion are formulated. Given $p_s$ $d(x; b_k)$, which represents the density over object boundary location, the probability that any given point x lies inside of the boundary is equal to the integral of $p_s(d)$ over all distances larger than $d(x; b_k)$. More precisely, $w(x; b_k)$ is simply the cumulative probability $p_s(d<d(x; b_k))$. As illustrated in FIG. 7(B), probability density $p_s$ is modeled such that the occupancy probability, $w(x; b_k)$ has a simple form. That is, $w(x; b_k)$ is unity in the exclusive spatial support region 610 of polybone $b_k$, and it decays outside the polygon (i.e., in boundary region 620) with the shape of a half-Gaussian as a function of distance from the polygon. In one embodiment, the standard deviation of the half-Gaussian, $\sigma_{s,k}$, is taken to be a constant.

Visibility

With this definition of spatial occupancy, the visibility of the $j^{th}$ polybone at a pixel x is the product of the probabilities that all closer layers do not occupy that pixel. That is, the probability of visibility is $$v_k(x) = \prod_{j=k+1}^{K} (1 - w(x; b_j)) \qquad (3)$$
$$= (1 - w(x; b_{k+1}))v_{k+1}(x).$$

Here all pixels in layer K, the foremost layer, are taken to be visible, so $v_K(x)=1$. Of course, the visibility of the background layer is given by $$v_0(x) = \prod_{j=1}^{K} (1 - w(x; b_j)). \qquad (4)$$

Note that transparency could also be modeled by replacing the term $(1-w(x; b_j))$ in equation (3) by $(1-\mu_j w(x; b_j))$ where $\mu_j \in [0,1]$ denotes the opacity of the $j^{th}$ polybone. The present embodiment represents a special case in which $\mu_j=0$. Another interesting variation is to let the opacity vary with the scale (and possibly position) of the information being passed through from the farther layers. This could model the view through a foggy window, or in a mirror, with the high frequency components of the scene blurred or annihilated but the low-pass components transmitted. However, only opaque polybones (i.e., $\mu_j=1$) are discussed in detail herein.

Likelihood Function

The likelihood of an image measurement at time t depends on both the information from the previous frame, convected (i.e., warped from one time to the next) according to the motion model, and on the appearance model for a given polybone.

For a motion model, a probabilistic mixture of parametric motion models (inliers) and an outlier process can be utilized (see "Mixture Models for Optical Flow Computation", A. Jepson and M. J. Black, Proceedings of IEEE Conference on Computer Vision and Pattern Recognition, pages 760–761, New York, June 1993). However, in the following discussion, a single inlier motion model is used, with parameters (stored in $m_k$) that specify the 2D translation, scaling, and rotation of the velocity field. More elaborate flow models, and more than one inlier process could be substituted in place of this simple choice.

Constraints on the image motion are obtained from image data in terms of phase differences (see, for example "Computation of Component Image Velocity from Local Phase Information", D. J. Fleet and A. D. Jepson, International Journal of Computer Vision, 5:77–104, 1990). From each image the coefficients of a steerable pyramid are computed based on the G2, H2 quadrature-pair filters described in "The Design and Use of Steerable Filters", W. Freeman and E. H. Adelson, IEEE Pattern Analysis and Machine Intelligence, 13:891–906, 1991. From the complex-valued coefficients of the filter responses the phase observations are obtained, denoted $\phi_t$ at time t. Constraints could also come from any other optical flow method (e.g., those described in "Performance of Optical Flow Techniques", J. L. Barron, D. J. Fleet, and S. S. Beauchemin, International Journal of Computer Vision, 12(1):43–77, 1994).

Within the exclusive spatial occupancy region (e.g., region 610, FIG. 6) and the "soft" (probabilistic) boundary region (region 620, FIG. 6), the likelihood of a velocity constraint at a point x is defined using a mixture of a Gaussian inlier density plus a uniform outlier process. The mixture model for a phase observation $\phi_{t+1}$ at time t+1, at a particular filter scale and orientation, is then $$p(\phi_{t+1} \mid \phi_t, m_k(t)) = (1 - m_l)p_w(\phi_{t+1} \mid \phi_t, m_k(t)) + m_l p_l. \qquad (5)$$

Here $p_l=1/(2\pi)$ is a uniform density over the range of possible phases, and $m_l$ is the mixing probability for the outliers. The inlier distribution $p_w(\phi_{t+1}|\phi_t, m_k(t))$ is taken to be a Gaussian distribution with mean given by $\phi_t=\phi_t(W(x; m_k(t)))$, the phase response from the corresponding location in the previous frame. The corresponding location in the previous frame is specified by the inverse image warp, $W(x; m_k(t))$, from time t+1 to time t. A maximum likelihood fit for the motion model parameters, $m_k(t)$, can be obtained using the EM-algorithm. This includes the standard deviation of the Gaussian, the outlier mixing proportion $m_l$, and the flow field parameters. Further details of this process are described in "Mixture Models for Optical Flow Computation", A. Jepson and M. J. Black, Proceedings of IEEE Conference on Computer Vision and Pattern Recognition, pages 760–761, New York, June 1993.

In addition to the 2-frame motion constraints used in equation (5), there arises the option of including an appearance model for the polybone at time t. Such an appearance model could be used to refine the prediction of the data at the future frame, thereby enhancing the accuracy of the motion estimates and tracking behavior. For example, the WSL appearance model described in co-owned and co-pending U.S. patent application No. 10/016,659, entitled "Robust, On-line, View-based Appearance Models for Visual Motion Analysis and Visual Tracking", which is incorporated herein by reference, provides a robust measure of the observation history at various filter channels across the polybone.

In practice there are phase observations from each of several filters tuned to different scales and orientations at any given position x. However, because the filter outputs are subsampled at ¼ of the wavelength to which the filter is tuned at each scale, phase observations are not obtained from every filter at every pixel. Letting D(x) denote the set of phase values from filters that produce samples at x, and assuming that the different filter channels produce independent observations, then the likelihood $p(D(x)|b_k)$ is simply a product of the likelihoods given above (i.e., equation (5)) for each phase observation.

Finally, give the visibility of bone k at pixel x, namely $v_k(x)$, and the spatial occupancy $w(x; b_k)$, the likelihood for the data $D(x)$ at position x can be written as $$p(D(x) \mid M) = \sum_{k=0}^{K} v_k(x) w(x; b_k) p(D(x) \mid b_k), \quad (6)$$

which is the mixture probability for the $k^{th}$ bone at location x. In words, equation (6) expresses the influence of the $k^{th}$ polybone at pixel x, as weighted by the visibility of this layer at that pixel (i.e., whether or not it is occluded), and the spatial occupancy of that layer (i.e., whether the pixel falls in the particular region being modeled).

Parameter Estimation

Suppose $M_0$ is an initial guess for the model parameters, in the form given in equation (1). In this section an objective function is described that reflects the overall quality of the global model, and an EM procedure is used for hill-climbing on it to find locally optimal values of model parameters. The objective function is based on the data likelihood introduced in equation (6), along with a second term involving the prior probability of the model. How initial model guesses are generated (i.e., block 320; FIG. 3) and how the best models are selected (i.e., block 340; FIG. 3) are discussed in subsequent sections.

Bayes theorem ensures that the posterior probability distribution over the model parameters M, given data over the entire image, $D=\{D(x)\}_x$, is $$p(M \mid D) = \frac{p(D \mid M) p(M)}{p(D)}. \quad (7)$$

The denominator here is a normalizing constant, independent of M, and so the numerator is referred to as the unnormalized posterior probability of M. If it is assumed that the observations $D(x)$ are conditionally independent given model parameters M, then the likelihood becomes $$p(D \mid M) = \prod_x p(D(x) \mid M). \quad (8)$$

The remaining factor in equation (7), namely p(M), is the prior distribution over the model parameters. Prior distribution (or simply "prior") p(M) is discussed in additional detail below.

The objective function $\mathcal{O}$ (M) utilized herein is the log of this unnormalized posterior probability $$\mathcal{O}(M) = \log p(D \mid M) + \log p(M) \quad (9)$$

Maximizing objective function $\mathcal{O}$ (M) is then equivalent to maximizing the posterior probability density of the model (given the assumption that the data observations are independent). However, it is important to remember that the normalization constant p(D) is discarded. This is justified since different models are considered for a single data set D. But it is important not to attribute the same meaning to the unnormalized posterior probabilities for models of different data sets; in particular, the unnormalized posterior probabilities for models of different data sets should not be directly compared.

A form of the EM-algorithm (see "Maximum Likelihood from Incomplete Data Via the EM Algorithm", A. P. Dempster, N. M. Laird, and D. B. Rubin, Journal of the Royal Statistical Society Series B, 39:1–38, 1977) is used to refine the parameter estimates provided by any initial guess, such as $M=M_0$. To describe this process it is convenient to first decompose the data likelihood term $p(D(x) \mid M)$ into three components, each of which depends only on a subset of the parameters. One component depends only on the parameters for the $k^{th}$ polybone. The other two components, respectively, depend only on the parameters for polybones in front of, or behind, the $k^{th}$ polybone.

From equations (3) and (6) it follows that the contribution to $p(D(x) \mid M)$ from only those polybones that are closer to the camera than the $k^{th}$ bone is $$n_k(x) = \sum_{j=k+1}^{K} v_j(x) w(x; b_j) p(D(x) \mid b_j) \quad (10)$$

$$= v_{k+1}(x) w(x; b_{k+1}) p(D(x) \mid b_{k+1}) + n_{k+1}(x).$$

The term $n_k(x)$ is referred to herein as the "near term" for the $k^{th}$ polybone. Notice that equation (10), along with equation (3), provide recurrence relations (decreasing in k) for computing the near terms and visibilities $v_k(x)$, starting with $n_K(x)=0$ and $v_K(x)=1$.

Similarly, the polybones that are further from the camera than the $k^{th}$ polybone are collected into the "far term" $f_k(x)$, which is defined as $$f_k(x) = \sum_{j=0}^{k-1} w(x; b_j) \left[ \prod_{l=j+1}^{k-1} (1 - w(x; b_l)) \right] p(D(x) \mid b_j) \quad (11)$$

$$= w(x; b_{k-1}) p(D(x) \mid b_{k-1}) + (1 - w(x; b_{k-1})) f_{k-1}(x).$$

Here the convention is used that $$\sum_{j=n}^{m} q_j = 0 \text{ and } \prod_{j=n}^{m} q_j = 1$$

whenever n>m. Notice that equation (11) gives a recurrence relation for $f_k$, increasing in k, and starting with $f_o(x)=0$.

The near and far terms, $n_k(x)$ and $f_k(x)$, have intuitive interpretations. The near term is the mixture of all the polybones closer to the camera than the $k^{th}$ term, weighted by the mixture probabilities $v_j(x) w(x; b_j)$. In particular $n_k(x)$ depends only on the polybone parameters $b_j$ for polybones that are nearer to the camera than the $k^{th}$ term. The far term is a similar mixture of the data likelihoods, but these are not weighted by $v_j(x) w(x; b_j)$. Instead, they are treated as if there are no nearer polybones, that is, without the effects on visibility caused by the $k^{th}$ or any of the closer polybones. As a result, $f_k(x)$ only depends on the polybone parameters $b_j$ for polybones that are further from the camera than the $k^{th}$ polybone.

Given these definitions, it follows that, for each $k \in \{0, \ldots, K\}$, the data likelihood satisfies $$p(D(x) \mid M) = n_k(x) + v_k(x) w(x; b_k) p(D(x) \mid b_k) + \quad (12)$$

$$v_k(x)(1 - w(x; b_k)) f_k(x).$$

Moreover, it also follows that $n_k(x)$, $v_k(x)$, and $f_k(x)$ do not depend on the parameters for the $k^{th}$ polybone, $b_k$. The dependence on $b_k$ has therefore been isolated in the two terms $w(x; b_k)$ and $p(D(x)|b_k)$ in equation (12). This simplifies the EM formulation given below.

E-Step

In order to maximize the objective function $\mathcal{O}$ (M), it is necessary to obtain the gradient of $\mathcal{O}$ (M) with respect to the model parameters. The gradient of the log p(M) term is straight-forward (see discussion below), so attention is applied to differentiating the log-likelihood term, log p(D|M). By equation (8) this will be the sum, over each observation at each pixel x, of the derivatives of log p(D(x)|M). The derivatives of this with respect to the $k^{th}$ polybone parameters $b_k$ can then be obtained by differentiating equation (12). The form of the gradient is first derived with respect to the internal polybone parameters (i.e., those that do not change the polybone occupancy). These are the motion parameters and the appearance model parameters, if an appearance model were used beyond the two-frame motion constraints used here. The gradient with respect to the pose parameters (i.e., the shape, size and position parameters of the polybone) is then considered.

Let $\alpha$ denote any internal parameter in $b_k$, that is, one that does not affect the polybone occupancy. Then, the derivative of log p(D(x)|M) with respect to $\alpha$ is given by $$\frac{\partial}{\partial \alpha} \log p(D(x) | M) = \tau_k(x; M) \frac{\partial}{\partial \alpha} \log p(D(x) | b_k), \quad (13)$$

where $\tau_k(x)$ is the ownership probability of the $k^{th}$ polybone for the data D(x), $$\tau_k(x; M) = \frac{v_k(x) w(x; b_k) p(D(x) | b_k)}{p(D(x) | M)}. \quad (14)$$

In the EM-algorithm, the interpretation of equation (14) is that $\tau_k(x;M)$ is just the expected value of the assignment of that data to the $k^{th}$ polybone, conditioned on the model parameters M. Accordingly, in equation (13), this ownership probability provides the weight assigned to the gradient of the log likelihood at any single data point D(x). The evaluation of the gradient in this manner is called the expectation step, or E-step, of the EM-algorithm.

Alternatively, let $\beta$ represent any pose parameter in $b_k$, that is one which affects only the placement of the polybone, and hence the occupancy $w(x; b_k)$, but not the data likelihood $p(D(x)|b_k)$. Then, the derivative of log p(D(x)|M) with respect to $\beta$ is given by $$\frac{\partial}{\partial \beta} \log p(D(x) | M) = \frac{v_k(x) \frac{\partial w}{\partial \beta}(x; b_k) [p(D(x) | b_k) - f_k(x)]}{p(D(x) | M)}. \quad (15)$$

This equation can also be rewritten in terms of the ownership probability $\tau_k(x;M)$ for the $k^{th}$ polybone and the lumped ownership for the far terms, namely $$\tau_{f,k}(x; M) = \frac{v_k(x) w(x; b_k) f_k(x)}{p(D(x) | M)}. \quad (16)$$

In particular, $$\frac{\partial}{\partial \beta} \log p(D(x) | M) = \tau_k(x; M) \frac{\partial}{\partial \beta} \log w(x; b_k) + \quad (17)$$
$$\tau_{f,k}(x; M) \frac{\partial}{\partial \beta} \log(1 - w(x; b_k)).$$

This again has a natural interpretation of each term being weighted by the expected ownership of a data item, for either the $k^{th}$ bone or the more distant bones, with the expectation conditioned on the current guess for the model parameters M.

Notice that, with some mathematical manipulation, one can show that the derivative of equation (17) is zero whenever $$\frac{w(x; b_k)}{1 - w(x; b_k))} = \frac{\tau_k(x; M)}{\tau_{f,k}(x; M)}.$$

This is the case when the odds given by the occupancy that the data item is associated with the $k^{th}$ polybone versus any of the further bones (i.e., the left side of the above equation) is equal to the odds given by the ownership probabilities (i.e. the right side). If the odds according to the occupancies are larger or smaller than the odds according to the data ownerships, then the gradient with respect to the pose parameters is in the appropriate direction to correct this. The cumulative effect of these gradient terms over the entire data set generates the "force" on the pose parameters of the $k^{th}$ polybone, causing it to move towards data that the $k^{th}$ polybone explains relatively well (in comparison to any other visible polybones) and away from data that it does not.

Equations (13) and (15) (or, equivalently, equation (17)) are referred to collectively as the E-step. The intuitive model for the E-step is that the ownership probabilities $\tau_k(x;M)$ provide a soft assignment of the data at each pixel x to the $k^{th}$ polybone. These assignments are computed assuming that the data was generated by the model specified with the given parameters M. Given these soft assignments, the gradient of the overall log-likelihood, log p(D|M), is then an ownership weighted combination of either the gradients of the data log-likelihood terms $p(D(x)|b_k)$ for an individual polybones (which contribute to the gradients) with respect to the internal polybone parameters $\alpha$), or the gradients of the occupancy terms log $w(x;b_k)$ and log $(1-w(x;b_k))$ (which contribute to the gradients with respect to the pose parameters). While equation (17) makes the intuition clear, it is noted in passing that equation (15) is more convenient computationally, since the cases in which $w(x; b_k)$ is 0 or 1 can be handled more easily.

M-step

Given the gradient of log p(D;M) provided by the E-step and evaluated at the initial guess $M_0$, the gradient of the objective function $\mathcal{O}$ (M) at $M_0$ can be obtained by adding the gradient of the log prior (see equation (9)). The maximization step (or M-step) consists of modifying $M_0$ in the direction of this gradient, thereby increasing the objective function (assuming the step is sufficiently small). This provides a new estimate for the model parameters, say $M_1$. The process of taking an E-step followed by an M-step is iterated, and this iteration is referred to as an EM-algorithm.

In practice it is found that several variations on the M-step, beyond pure gradient ascent, are both effective and computationally convenient. In particular, a front-to-back iteration is used through the recurrence relations of equations (3) and (10) to compute the visibilities $v_k(x)$ and the near polybone likelihoods $n_k(x)$ (from the nearest polybone at k=K to the furthest at k=0), without changing any of the polybone parameters $b_k$. Then the EM-algorithm outlined above is performed on just the background polybone parameters $b_0$. This improves the overall objective function $O$ by updating $b_0$, but does not affect $v_j(x)$ nor $n_j(x)$ for any j>0. The far term $f_1(x)$ is then computed using the recurrence relation of equation (11), and the EM-algorithm is run on just the polybone at k=1. This process is continued, updating $b_k$ alone, from the furthest polybone back to the nearest. This process of successively updating the polybone parameters $b_k$ is referred to as a back-to-front sweep. At the end of the sweep, the far terms $f_k(x)$ for all polybones are computed.

Due to the fact that polybone parameters $b_j$ for any closer polybone than the $k^{th}$ does not affect the far term $f_k(x)$, when the nearest polybone at k=K is reached, the correct far terms $f_k(x)$ have been accumulated for the updated model parameters M. Now the polybone parameters could be re-estimated in a front-to-back sweep (i.e., using the EM-algorithm to update $b_k$ with k decreasing from K to 0). In this case the recurrence relations of equations (3) and (10) provide the updated $v_k(x)$ and $n_k(x)$. These front-to-back and back-to-front sweeps can be done a fixed number of times, or iterated until convergence. In the practical examples described below, just one back-to-front sweep per frame was performed.

An alternative procedure is to start this process by first computing all the far terms $f_k(x)$ iterating from k=0 to K using equation (11), without updating the polybone parameters $b_k$. This replaces just the first front-to-back iteration in the previous approach (i.e., where the polybone parameters are not updated). Then the individual polybone parameters $b_k$ can be updated starting with a front-to-back sweep. The former start-up procedure has been found to be preferable in that the background layer parameters $b_0$ are updated first, allowing it to account for as much of the data with as high a likelihood as possible, before any of the foreground polybones are updated.

The overall rationale for using these front-to-back or back-to-front sweeps is a concern about the relative sizes of the gradient terms for different sized polybones. It is well known that gradient ascent is slow in cases where the curvature of the objective function is not well scaled. The sizes of the gradient terms are expected to depend on the amount of data in each polybone, and on the border of each polybone, and thus these may have rather different scales. To avoid this problem, just one polybone is considered at a time. Moreover, before doing the gradient computation with respect to the pose parameters of a polybone, care is taken to rescale the pose parameters to have roughly an equal magnitude effect on the displacement of the polybone.

In addition, the M-step update of each $b_k$ is split into several sub-steps. First, the "internal" parameters of the $k^{th}$ polybone are updated. For the motion parameters, the E-step produces a linear problem for the update, which is solved directly (without using gradient ascent). A similar linear problem arises when the WSL-appearance model (cited above) is used. Once these internal parameters have been updated, the pose parameters are updated using gradient ascent in the rescaled pose variables. Finally, given the new pose, the internal parameters are re-estimated, completing the M-step for $b_k$.

One final refinement involves the gradient ascent in the pose parameters, where a line-search is used along the fixed gradient direction. Since the initial guesses for the pose parameters are often far from the global optimum (see discussion below), the inventors found it useful to constrain the initial ascent to help avoid some local maxima. In particular, unconstrained hill-climbing from a small initial guess was found to often result in a long skinny polybone wedged in a local maximum. To avoid this behavior the scaling parameters $s_x$ and $s_y$ are initially constrained to be equal, and just the mean position $(c_x, c_y)$, angle $\theta$, and the overall scale are updated. Once a local maximum in these reduced parameters is detected, the relative scales $s_x$ and $s_y$ are allowed to evolve to different values.

FIGS. 8(A) through 8(G) are a series of photographs showing a practical example of the overall process in which a can 810 is identified using a single foreground polybone $b_1$ (note that the spatial support region of polybone $b_1$ is indicated by the highlighted area). The image sequence is formed by moving the camera horizontally to the right, so can 810 moves horizontally to the left, faster than the background within the image frames. For this experiment a single background appearance model was used, which is then fit to the motion of the back wall. The outliers in this fit were sampled to provide an initial guess for the placement of foreground polybone $b_1$. The initial size of foreground polybone $b_1$ was set to 16 pixels on both axes, and the motion parameters were set to zero. A more complete discussion of the start-up procedure is provided below. No appearance model is used beyond the 2-frame flow constraints in equation (5).

Figure 8A:
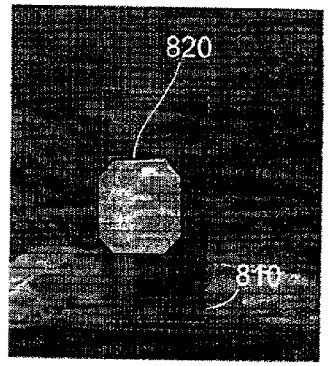
FIGS. 8(A) through 8(G) are a series of photographs depicting a first practical example of the visual motion analysis method of the present invention.

In FIG. 8(A), the configuration is shown after one back-to-front sweep of the algorithm (using motion data obtained using frames). Notice that foreground polybone $b_1$ at time t0 has grown significantly from its original size, but the relative scaling along the two sides of polybone $b_1$ is the same. This uniform scaling is due to the clamping of the two scale parameters, since the line-search in pose has not yet detected a local maximum. Thus, FIG. 8(A) illustrates that polybone pose parameters can be effectively updated despite a relatively small initial guess, relatively sparse image gradients on can 810, and outliers caused by highlights.

Figure 8B:
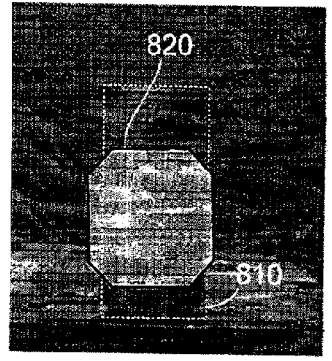
Figure 8C:
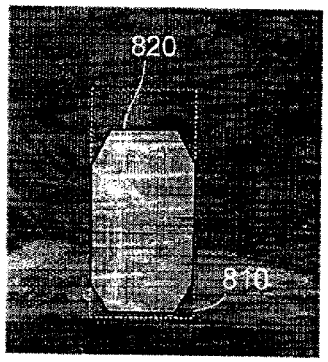
Figure 8D:
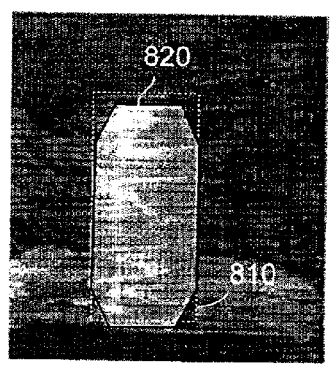
Figure 8E:
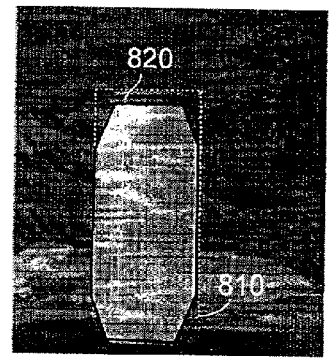
Figure 8F:
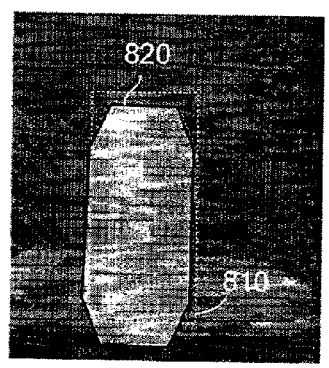
Figure 8G:
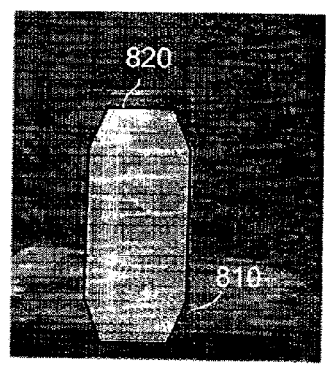

In FIG. 8(B), the line-search has identified a local maximum, releasing the constraint that the relative scales $s_x$ and $s_y$ must be equal in subsequent frames. Notice that the local maximum identified in this image frame over-estimates the width of can 810. This effect reflects the expansion pressure due to the coherent data above and below polybone $b_1$, which is balanced by the compressive pressure due to background on the two sides of polybone $b_1$.

In the subsequent frames shown in FIGS. 8(C) through 8(G), the shape and motion parameters of polybone $b_1$ are adjusted to approximate the location of can 810. The sides of can 810 are now well fit. At the top of can 810 the image consists of primarily horizontal structure, which is consistent with both the foreground and background motion models. In this case there is no clear force on the boundary of the top of polybone $b_1$, one way or the other. Given a slight prior bias towards smaller polybones (see discussion below), the top of can 810 has therefore been underestimated by polybone $b_1$. Conversely, the bottom of can 810 has been overestimated due to the consistency of the motion data on can 810 with the motion of the end of the table on which can 810 sits. In particular, the end of the table is moving more like foreground polybone $b_1$ than the background layer, and therefore foreground polybone $b_1$ has been extended to account for this data as well.

The sort of configuration obtained in the later image frames (e.g., FIGS. 8(D) through 8(G)) could have been obtained with just the first two frames (e.g., FIGS. 8(A) and 8(B)) if the hill-climbing procedure was iterated and run to convergence. However, this approach is not used in the practical embodiment because the inventors found it more convenient to interleave the various processing steps across several frames, allowing smaller updates of the polybone parameters to affect the other polybones in later frames.

Model Search

Given that the hill-climbing process is capable of refining a rough initial guess, such as is demonstrated in FIGS. 8(A) through 8(G), two more components are required for a complete system.

First, a method for generating appropriate initial guesses is required. That is, initial values are required for the parameters that are sufficiently close to the most plausible model(s) so that the hill-climbing process will converge to these models, as depicted in FIGS. 8(A) through 8(G). Because the landscape defined by the objective function (equation (9)) is expected to be non-trivial, with multiple local maxima, it is difficult to obtain guarantees on initial guesses. Instead, a probabilistic local (heuristic) search is used for proposing various plausible initial states for the hill-climbing process. With a reasonably high probability that such probabilistic local searches generate appropriate initial guesses, it is anticipated that nearly optimal models will be found within a few dozen trials. Whether or not this turns out to be the case depends on both the proposal processes implemented and on the complexity of the objective function landscape.

Second, an appropriate computational measure is needed to determine exactly what is meant by a "more plausible" or "best" model. That is, given any two alternative models for the same image sequence data, a comparison measure is needed to determine which model one is more plausible. Naturally, the objective function (equation (9)) is used for this measure, and here the prior distribution p(M) used plays a critical role. Details of prior distribution p(M) are discussed below.

According to another aspect of the present invention, simple baseline approaches are used for both model comparison and model proposals, rather than optimized algorithms. The central issue addressed below is whether or not simple strategies can cope with the image data presented in typical image sequences.

Heuristic Search (Model Generation)

According to another aspect of the present invention, the targeted heuristic search utilized by the visual motion analysis method generates a model framework (i.e., set of possible models) in a manner that produces multiple layered motion models having different numbers of foreground components (polybones), depth orderings, and/or other parameter (e.g., size, location of the polybones). The set of possible models is partitioned according to the number of polybones each model contains. Currently, all models have a background layer (sometimes referred to herein as a background polybone) covering the entire image, so the minimum number of polybones in any model is one. The example shown in FIGS. 8(A) through 8(G) consists of two polybones (the background polybone, which is not highlighted, and foreground polybone $b_1$). Other examples described below have up to five polybones (background plus four foreground polybones).

The model framework initially starts with a first generation (core) model, which is used to periodically (e.g., each image frame or other predefined time period) spawn one or more additional motion models having one or more foreground polybones. The initial "core" proposal model includes the entire image, and only requires an initial guess for the motion parameters. Simple backgrounds are considered, and the initial guess of zero motion is sufficient in most instances. A parameterized flow model is then fit using the EM-algorithm described above.

At any subsequent stage of processing the model framework includes a partitioned set of models, $$\mathcal{M}(t)=(\mathcal{M}_0(t), \mathcal{M}_1(t), \ldots , \mathcal{M}_{\bar{K}}(t)), \qquad (18)$$

where $\mathcal{M}_K(t)$ is a list of models in the model framework at frame t, each with exactly K foreground polybones. Model framework $\mathcal{M}(t)$ is sorted in decreasing order of the objective function $\mathcal{O}$ (M) (i.e., with the highest ranked models at the front of the list). Also, the term $\bar{K}$ in equation (18) is a user-supplied constant limiting the maximum number of polybones to use in any single model. The number of models in each list $\mathcal{M}_K(t)$ is limited by limiting each one to contain only the best models found after hill-climbing (from amongst those with exactly K foreground polybones). In one embodiment, this pruning keeps only the best model within $\mathcal{M}_K(t)$, but it is often advantageous to keep more than one in many cases. At the beginning of the sequence, $\mathcal{M}_0(t)$ is initialized to the fitted background layer, and the remaining $\mathcal{M}_K(t)$ are initialized to be empty for $K \geq 1$.

The use of a partitioned set of models was motivated by the model search used in "Qualitative Probabilities for Image Interpretation", A. D. Jepson and R. Mann, Proceedings of the IEEE International Conference on Computer Vision, volume II, pages 1123–1130, Corfu, Greece, September (1999), and the cascade search developed in "Exploring Qualitative Probabilities for Image Understanding", J. Listgarten. Master's thesis, Department of Computer Science, University of Toronto, October (2000), where similar partitionings were found to be useful for exploring a different model space. The sequence of models in $\mathcal{M}_o(t)$ through $\mathcal{M}_K(t)$ can be thought of as a garden path (or garden web) to the most plausible model in $\mathcal{M}_K(t)$. In the current search the models in this entire garden path are continually revised through a process where each existing model is used to make a proposal for an initial guess of a revised model. Then hill-climbing is used to refine these initial guesses, and finally the fitted models are inserted back into the partitioned set. The intuition behind this garden path approach is that by revising early steps in the path, distant parts of the search space can be subsequently explored.

Clearly, search strategies other than those described above can be used. For example, another choice would be to keep only keep the best few models, instead of the whole garden path, and just consider revisions of these selected models. A difficulty here arises when the retained models are all similar, and trapped in local extrema of the objective function. In that situation some more global search mechanism, such as a complete random restart of the search, is needed to explore the space more fully.

According to an embodiment of the present invention, two kinds of proposals are considered in further detail for generating initial guesses for the hill-climbing process, namely temporal prediction proposals and revision proposals. These two types of proposals are discussed in the following paragraphs.

Given a model $S(t-1) \in \mathcal{M}_K(t-1)$, the temporal prediction proposal provides an initial guess G(t), for the parameters of the corresponding model in the subsequent frame. Here S(t-1) is referred to as the seed model used to generate the guess G(t). The initial guess G(t) is generated from the seed S(t-1) by convecting each polybone (other than the background model) in S(t-1) according to the flow for that polybone. The initial guess for the flow in each polybone is obtained from a constant velocity or constant acceleration prediction. A constant model is used for the temporal prediction of the appearance model, although the details depend on the form of appearance model used.

Given the initial guess G(t), the hill-climbing procedure is run and the resulting fitted model M(t) is inserted into the model list $\mathcal{M}_K(t)$, preserving the decreasing order of the objective function (equation (9)) within this list. Notice that temporal prediction proposals do not change the number of polybones in the model, nor their relative depths, but rather they simply attempt to predict where each polybone will be found in the subsequent frame.

In order to change the number of polybones, or their depths, revision proposals are considered. A revision proposal selects a seed to be a previously fit model, say $S_k(t) \in \mathcal{M}_K(t)$. This seed model is used to compute an outlier map, which provides the probability that the data at each image location x is considered to be an outlier according to all the visible polybones within $S_k(t)$ at that location. This map is then blurred and downsampled to reduce the influence of isolated outliers. The center location for a new polybone is selected by randomly sampling from this downsampled outlier map, with the probability of selecting any individual center location being proportional to the value of the outlier map at that location. Given the selected location, the initial size of the new polybone is taken to be fixed (16×16 was used in the practical examples disclosed herein), the initial angle is randomly selected from a uniform distribution, and the relative depth of the new polybone is randomly selected from the range 1 to K (i.e., it is inserted in front of the background bone, but otherwise at a random position in the depth ordering).

As a result this revision proposal produces an initial guess $G_{k+1}(t)$ from the seed $S_k(t)$ which has exactly one new polybone in addition to all of the original polybones in the seed. The initial guess $G_{k+1}(t)$ is then used by the hill-climbing procedure, and the resulting fitted model $M_{k+1}(t)$ is inserted into the list $\mathcal{M}_{K+1}(t)$ according to the value of $\mathcal{O}(M_{k+1}(t))$.

In summary, one time step of the algorithm involves taking all the models in the partitioned set $\mathcal{M}(t-1)$ and propagating them forward in time using the temporal prediction proposals followed by hill-climbing, thereby forming a partitioned set of models for framework $\mathcal{M}(t)$ at time t. Then, for each model in $\mathcal{M}(t)$, a model revision proposal is performed, followed by hill-climbing. The revised models are inserted back into $\mathcal{M}(t)$. The updated sorted lists in $\mathcal{M}_K(t)$ for K=0, ..., $\overline{K}$ are then pruned to be within the maximum allowable length. Finally, the best model is selected from the different sized models within $\mathcal{M}(t)$, say $M_k(t)$. It maybe found useful to also delete from $\mathcal{M}(t)$ any model with more than K foreground polybones. This last step helps to avoid spending computational effort propagating non-optimal models that include many weakly supported polybones. This completes the processing for the current frame t.

Figure 9:
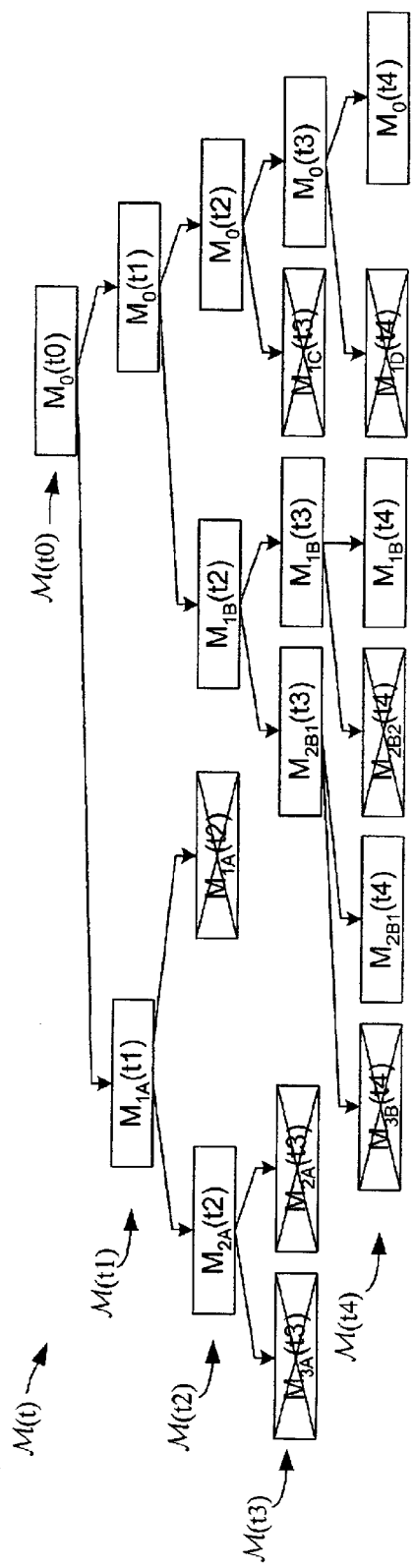
FIG. 9 is a flow diagram showing the generation of a model framework formed using a heuristic search method according to a simplified example of the present invention.

FIGS. 9 through 16(D) are directed to a simplified example showing the generation of a model framework $\mathcal{M}(t)$ using a heuristic search approach according to an embodiment of the present invention. This example refers to the simplified image sequence introduced above and described with reference to FIGS. 2(A) through 2(E). FIG. 9 is a diagram illustrating the "garden web" generation of global models in model framework $\mathcal{M}(t)$ (see equation (18)) according to the simplified example. FIGS. 10 through 16(D) depict various polybones and global models included in the model framework. The example assumes no background motion. In addition, the example assumes that new foreground polybones are inserted between existing foreground polybones and the background layer.

Figure 10:
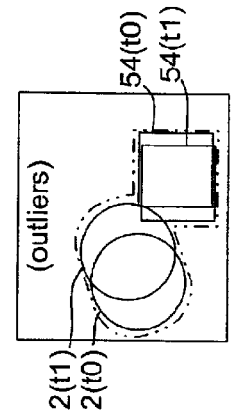
FIG. 10 is a simplified diagram depicting appearance data for a core model of the simplified example shown in FIG. 9.

Referring to the upper right portion of FIG. 9 and to FIG. 10, model framework $\mathcal{M}(t0)$ includes only a core model $M_0$, which serves as the initial seed model in this example, and is initiated at time t0 using image data provided in frame F0 (shown in FIG. 2(A)). FIG. 10 indicates that the appearance data of core model $M_0(t0)$ includes all three objects (circle, square, and star) at the initial time t0. Note again that core model $M_0$ does not include a foreground polybone at any point during the heuristic search process.

Referring again to FIG. 9, at time t1 core model $M_0$ is propagated (updated) using the image data provided in frame F1, and is utilized to generate a first generation, single foreground polybone global model $M_{1A}(t1)$ (as indicated by the arrows extending downward from core model $M_0(t0)$ in FIG. 9). Accordingly, at time t1, model framework $\mathcal{M}(t1)$ includes two models: core model $M_0(t1)$ and first generation global model $M_{1A}(t1)$, which are refined as described above.

Figure 11A:
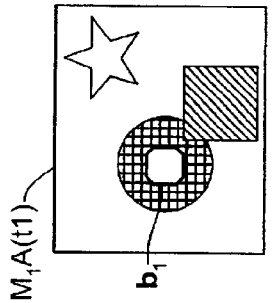
FIGS. 11(A) and 11(B) are simplified diagrams depicting updated appearance data and an outlier chart, respectively, associated with the core model of the simplified example.
Figure 11B:
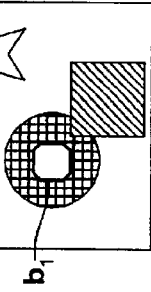

As indicated in FIGS. 11(A) and 11(B), at time t1, core model $M_0$ is updated using the image data provided in frame F1, and the image data from frames F0 and F1 are compared to identify regions containing outliers indicating the presence of a moving object. For example, FIG. 11(B) indicates superimposed positions of circle 52 and square 54 from frames F0 and F1. The outlier regions associated with these position changes provide two plausible moving object locations (i.e., one centered in the region associated with circle 52, and one centered in the region associated with square 54). As described above, the heuristic approach utilized by the present invention randomly selects one of these two possible regions, and first generation, single foreground polybone global model $M_{1A}(t1)$ is generated by assigning a foreground polybone to the selected outlier region. In the present example, it is assumed that the outlier region associated with circle 52 is arbitrarily selected.

Figure 12A:
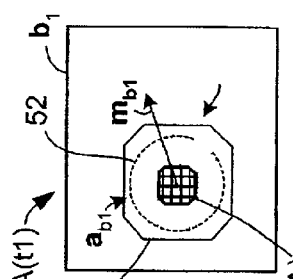
FIGS. 12(A), 12(B) and 12(C) are simplified diagrams depicting a background layer, a foreground polybone, and a combined global model, respectively, associated with another model of the simplified example shown in FIG. 9.
Figure 12B:
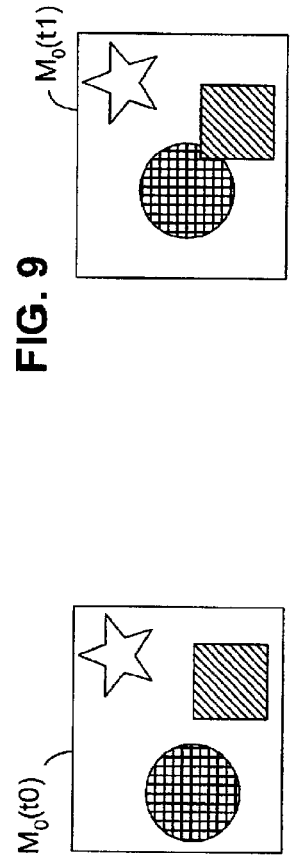
Figure 12C:
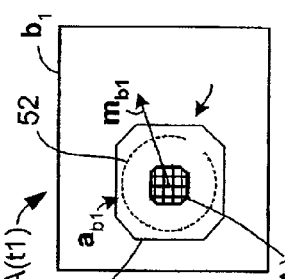

FIGS. 12(A), 12(B) and 12(C) depict background polybone (layer) $b_0$, foreground polybone $b_1$, and combined global model $M_{1A}(t1)$, respectively. As indicated in FIG. 12(A), an appearance model $a_{b0}$ for background polybone $b_0$ at time t1 includes all appearance data for square 54 and star 56, but only part of circle 52. Referring to FIG. 12(B), the initial exclusive spatial support region $610(M_{1A})$ of foreground polybone $b_1$ is still relatively small (due to growth rate constraints), and the uncertainty boundary region 620 $(M_{1A})$ is still relatively large such that it reliably includes the actual boundary of circle 52. As discussed above, spatial support region $610(M_{1A})$ is exclusively "owned" by foreground polybone $b_1$, which is indicated by the cross-hatching shown in FIG. 12(B) and the corresponding blank region shown in background polybone $b_0$ (FIG. 12(A)). In contrast, boundary region $620(M_{1A})$ is only partially "owned" by foreground polybone $b_1$, which is indicated by the dashed lines and shading in FIG. 12(B). Note the corresponding dashed/shaded region shown in FIG. 12(A), which indicates partial ownership of this region by background polybone $b_0$. Similar to the sequence shown in FIGS. 8(A) through 8(G), global model $M_{1A}$ (FIG. 12(C)) is indicated by foreground polybone superimposed over the image data.

After the model refining process is completed, the two existing global models are ranked (compared) to determine which global model in model framework $\mathcal{M}(t1)$ best describes the image data at time t1. This model ranking process is described in additional detail below. However, because global model $M_{1A}$ includes polybone $b_1$ that accurately represents at least a portion of one of the moving objects (i.e., circle 52), the ranking process will typically rank global model $M_{1A}$ higher than core model $M_0$ because, in most cases, a global model with one polybone (e.g., global model $M_{1A}$) better represents the image sequence having multiple moving objects than the core model, which by definition has zero foreground polybones. Note that, because the number of models is each global model group is one (i.e., $\mathcal{M}_0(t1)$ and $\mathcal{M}_1(t1)$ each include only a single global model), no models are eliminated at the end of the ranking process at time t1.

Referring again to FIG. 9, at time t2 core model $M_0$ is again propagated in a manner similar to that described above, and is utilized to generate a second generation, single foreground polybone global model $M_{1B}(t2)$ (as indicated by the arrows extending downward from core model $M_0(t1)$ in FIG. 9). In addition, first generation global model $M_{1A}$ is propagated, and is utilized to generate a second generation, double foreground polybone global model $M_{2A}(t2)$ (as indicated by the arrows extending downward from global model $M_{1A}(t1)$ in FIG. 9). Accordingly, at time t2, the model framework $\mathcal{M}(t2)$ initially includes four models: core model $M_0(t2)$, first generation global model $M_{1A}(t2)$, second generation global model $M_{1B}(t2)$, and second generation global model $M_{2A}(t2)$, which are then refined as described above.

Core model $M_0$ is updated using the image data provided in frame F2 (see FIG. 2(C) in a manner similar to that shown above in FIG. 11(A), and the image data from frames F1 and F2 are compared to identify regions containing outliers indicating the presence of moving objects in a manner similar to that shown in FIG. 11(B). As in the discussion above, this process yields two outlier regions associated with the moving circle 52 and square 54, one of which is then randomly selected for the generation of second generation, single foreground polybone global model $M_{2A}$ (t2). In the present example, it is assumed that the outlier region associated with square 54 is selected.

FIGS. 13(A), 13(B) and 13(C) depict background polybone (layer) $b_0$, foreground polybone $b_1$, and global model $M_{1B}$ at time t2, respectively. As indicated in FIG. 13(A), an appearance model $a_{b0}$ for background polybone $b_0$ includes all appearance data for circle 52 and star 56, but only part of square 54. Referring to FIG. 13(B), the initial exclusive spatial support region $610(M_{1B})$ of foreground polybone $b_1$ is still relatively small, and the uncertainty boundary region $620(M_{1B})$ is still relatively large. Global model $M_{1B}$ (FIG. 13(C)) is indicated by foreground polybone superimposed over the image data associated with square 54.

FIGS. 14(A), 14(B) and 14(C) depict background polybone (layer) $b_0$, foreground polybone $b_1$, and global model $M_{1A}$ at time t2, respectively, which is updated using image data from frames F1 and F2. Similar to FIG. 12(A), FIG. 14(A) shows an appearance model $a_{b0}$ for background polybone $b_0$ that includes all appearance data for square 54 and star 56, but only part of circle 52. Referring to FIG. 14(B), spatial support region $610(M_{1A})$ of foreground polybone $b_1$ has grown from its initial smaller size, and the uncertainty boundary region $620(M_{1A})$ is smaller. However, the presence of square 54 over the lower portion of circle 52 prevents spatial support region $610(M_{1A})$ from expanding into this region. Global model $M_{1A}$ (FIG. 14(C)) is indicated by foreground polybone superimposed over the image data associated with square 54.

In addition to updating global model $M_{1A}$ as shown in FIGS. 14(A) through 14(C), the image data from frames F1 and F2 is also utilized to generate second generation, double polybone global model $M_{2A}$. This generation process is similar to that utilized with respect to core model $M_0$ in that the appearance data associated with updated background polybone (layer) $b_0$ is compared with the appearance data of the previous frame in order to identify additional outlier regions. In the ideal image sequence of the simplified example, the only other outlier region would be that associated with square 54, although in practical examples many smaller outlier regions may be identified as possible moving objects. Note that filtering may be used to de-emphasize these smaller outlier regions.

FIGS. 15(A), 15(B), 15(C) and 15(D) depict background polybone (layer) $b_0$, first foreground polybone $b_1$, second foreground polybone $b_2$, and global model $M_{2A}$ at time t2, respectively. FIG. 15(A) shows an appearance model $a_{b0}$ for background polybone $b_0$ that includes partial appearance data for square 54 and circle 52, and for the unoccluded portion of star 56. FIG. 15(B) shows first foreground polybone $b_1$ is similar to foreground polybone $b_1$ of global model $M_{1B}$ (see FIG. 13(B)). Similarly, FIG. 15(C) shows that second foreground polybone $b_2$ is similar to that of global model $M_{1A}$ (see FIG. 14(B)). Finally, FIG. 15(D) shows the composite global model $M_{2A}$, which shows first foreground polybone $b_1$ and second foreground polybone $b_2$ superimposed over the image data associated with frame F2 (shown in FIG. 2(C). Note that, based on the prescribed depth ordering, newly generated polybone $b_1$ is located between second foreground polybone $b_2$ and background polybone $b_0$. Note also that this depth ordering is incorrect with respect to the example, which clearly indicates that square 54 is located in front of circle 52 (due to the occlusion of circle 52 by square 54).

After the model refining process is completed, the models are ranked to determine which model best represents the image data in model framework $\mathcal{M}(t2)$, and one of the single polybone global models (i.e., either $M_{1A}$ or $M_{1B}$) is deleted from group $\mathcal{M}_1(t2)$ to comply with the one-model-per-group constraint placed on the heuristic model generation process. As indicated by the "X" through global model $M_{1A}$ in FIG. 9, the ranking process (described in additional detail below) is assumed to conclude that global model $M_{1B}$ better represents the image data because, for example, the occlusion of square 54 over circle 52 is better explained by model $M_{1B}$ than model $M_{1A}$. The "X" in FIG. 9 indicates that global model $M_{1A}$ is deleted from the model framework. The remaining models (i.e., core model $M_0$, global model $M_{1B}$, and global model $M_{2A}$) are then compared to determine which of the remaining models best describes the image data. Note that the two foreground polybones of global model $M_{2A}$ may better describe the image data if, for example, more of the image data is explained by two foreground polybones than one foreground polybone, even though the depth ordering of model $M_{2A}$ is incorrect. Conversely, based on the bias toward a few number of polybones, the ranking process may determine that global model $M_{1B}$ ranks higher than global model $M_{2A}$.

Referring again to FIG. 9, at time t3 core model $M_0$ is again propagated in a manner similar to that described above, and is utilized to generate a third generation, single foreground polybone global model $M_{1C}(t3)$. In addition, global model $M_{1B}$ is propagated, and is utilized to generate a third generation, double foreground polybone global model $M_{2B1}(t3)$, and global model $M_{2A}$ is propagated, and is utilized to generate a third generation, three-foreground polybone global model $M_{3A}(t3)$. Accordingly, model framework $\mathcal{M}(t3)$ initially includes six global models: core model $M_0(t3)$, group $\mathcal{M}_1$ models $M_{1B}(t3)$ and $M_{1C}(t3)$, group $\mathcal{M}_2$ models $M_{2A}(t3)$ and $M_{2B1}(t3)$, and group $\mathcal{M}_3$ model $M_{3A}(t3)$. These models are then refined as described above.

Core model $M_0$ is updated as described above, and new global model $M_{1C}$ is generated in the manner described above. For brevity, as indicated in FIG. 9, global model $M_{1C}$ is assumed to not rank higher than global model $M_{1B}$, and is therefore assumed to be eliminated during the ranking process (indicated by superimposed "X").

Global model $M_{1B}$ is updated using image data from frame F3 (see FIG. 2(D)) in a manner similar to that described above with reference to global model $M_{1A}$. Global model $M_{1B}$ also spawns a second double-foreground polybone model $M_{2B1}$ in a manner similar to that described above with reference to global model $M_{2A}$.

FIGS. 16(A), 16(B), 16(C) and 16(D) depict background polybone (layer) $b_0$, first foreground polybone $b_1$, second foreground polybone $b_2$, and global model $M_{2B1}$ at time t2, respectively. FIG. 16(A) shows an appearance model $a_{b0}$ for background polybone $b_0$ that includes partial appearance data for square 54 and circle 52, and for the unoccluded portion of star 56. FIG. 16(B) shows first foreground polybone $b_1$ is similar to foreground polybone $b_1$ is similar to foreground polybone $b_1$ of global model $M_{1A}$ (see FIG. 14(B)). Similarly, FIG. 16(C) shows that second foreground polybone $b_2$ is similar to foreground polybone $b_1$ of global model $M_{1B}$ (see FIG. 13(B)). FIG. 16(D) shows the composite global model $M_{2B}$, which shows first foreground polybone $b_1$ and second foreground polybone $b_2$ superimposed over the image data associated with frame F3 (shown in FIG. 2(D)). Note that, based on the prescribed depth ordering, newly generated polybone $b_1$ is located between second foreground polybone $b_2$ and background polybone $b_0$. Note also that this depth ordering is correct with respect to the example (i.e., second foreground polybone $b_2$ is correctly assigned to square 54, which is located in front of circle 52.

Referring again to FIG. 9, in addition to the update of global model $M_{1B}$ and the generation of global model $M_{2B1}$, global model $M_{2A}$ is also updated, and spawns a three-foreground polybone global model $M_{3A}$. The update of global model $M_{2A}$ and the generation of polybone global model $M_{3A}$ are performed in a manner similar to that described above, and are not illustrated for brevity. Note that, because there are no more significant moving objects in the image sequence, the generation of three-foreground polybone global model $M_{3A}$ typically requires the assignment of a new polybone to spurious outliers occurring between frames 2 and 3, and such polybones typically fail to grow during the refining process due to the lack of continuity in subsequent frames.

After the model refining process is completed, the models are ranked to determine which model best represents the image data. As mentioned above, it is assumed that single foreground polybone global model $M_{1B}$ ranks higher than newly spawned global model $M_{1C}$, so global model $M_{1C}$ is deleted. Further, when group $\mathcal{M}_2$ models $M_{2A}(t3)$ and $M_{2B1}(t3)$ are ranked, global model $M_{2B1}(t3)$ ranks higher because the depth ordering of its polybones more accurately describes the depth ordering of circle 52 and square 54. That is, global model $M_{2B1}(t3)$ is able to better account for and anticipate the movement of circle 52 and square 54 in the image sequence. Accordingly, global model $M_{2A}$ is deleted (indicated in FIG. 9 by the superimposed "X"). Finally, because the third polybone of three-polybone global model $M_{3A}$ does not model an actual moving object having significant size, the example assumes that two-polybone global model $M_{2B1}$ ranks higher than global model $M_{3A}$, thereby resulting in the deletion of model $M_{3A}$ from model framework $\mathcal{M}(t3)$.

Subsequently, as indicated in FIG. 9, model framework $\mathcal{M}(t4)$ updates the remaining models and generates a next generation of global models in the manner described above, with global model $M_{2B1}$ retaining the "best model" ranking. Note that model $M_{2B1}$ would fail if, for example, the image sequence proceeded to a point where circle 52 or square 54 stopped moving, or moved out of the image. If one object remains moving and one object stops moving or exits the image sequence, a newly generated single-polybone model spawned from core model $M_0$ may provide the best representation of the image sequence at that time, and this new single-polybone model would replace global model $M_{2B1}$ as the "best model" at that time. Similarly, if both circle 52 and square 54 stopped moving or moved out of the image, core model $M_0$ may become the "best model". Accordingly, the heuristic approach allows a great deal of flexibility in adjusting to changes in the image sequence, while facilitating the identification and tracking of an arbitrary number of moving objects.

Figure 17A:
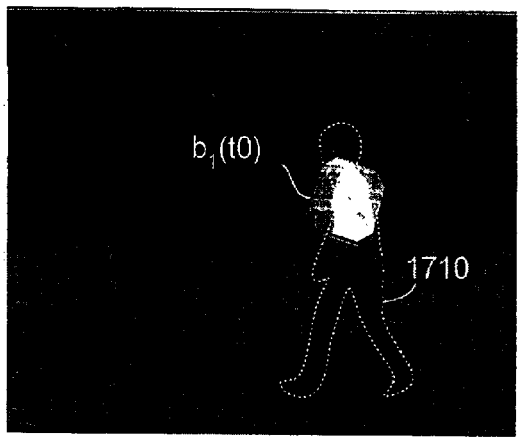
FIGS. 17(A) through 17(F) are a series of photographs depicting a second practical example of the visual motion analysis method of the present invention.
Figure 17B:
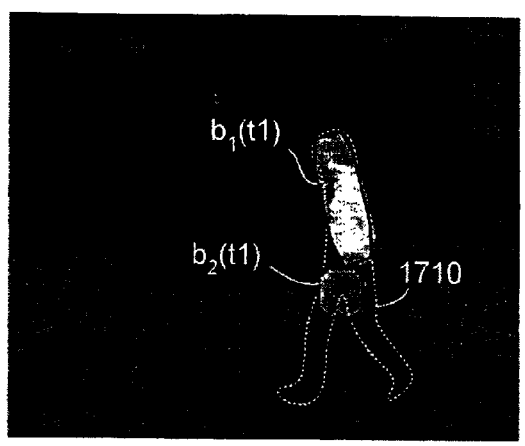
Figure 17C:
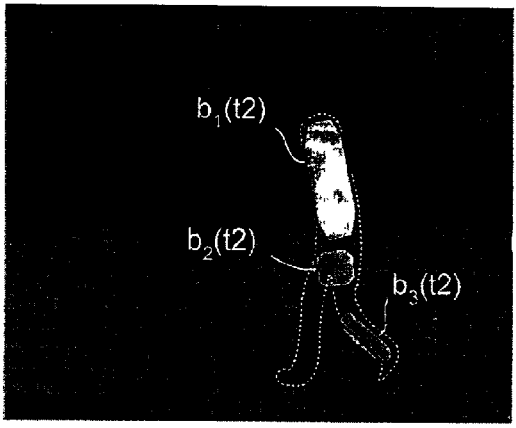
Figure 17D:
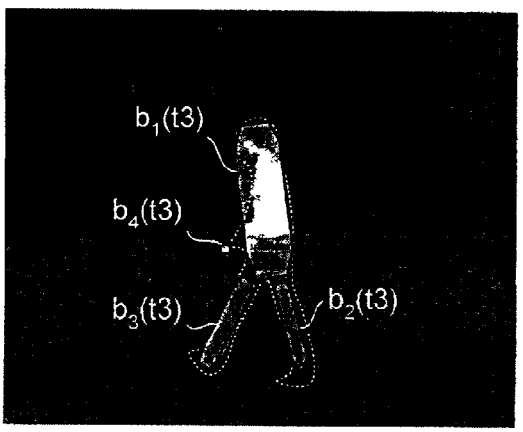
Figure 17E:
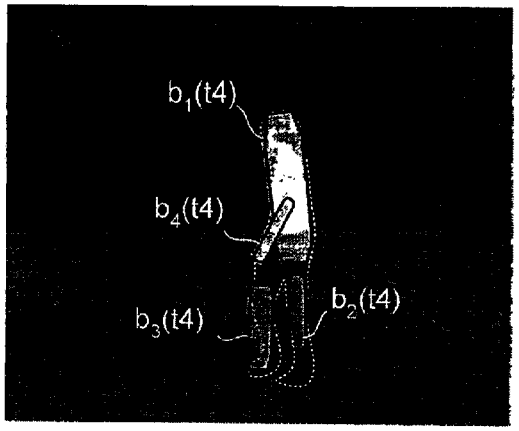
Figure 17F:
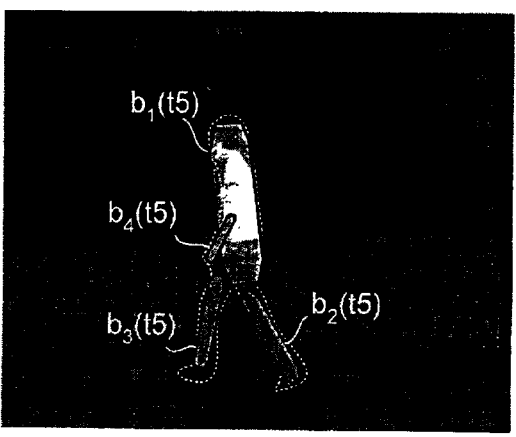

A practical example depicting the heuristic search process is shown in the series of photographs of FIGS. 17(A) through 17(F) showing a walking person 1710 (outlined in dashed lines for easier identification). Initially, as shown in FIG. 17(A) a single foreground bone $b_1(t0)$ is proposed from the outliers in the background layer in the manner described above. Foreground bone $b_1(t0)$ is fit using hill-climbing, with the relative sizes $s_x$ and $s_y$ of foreground polybone $b_1(t0)$ initially clamped to be equal. In FIG. 17(B), foreground polybone $b_1(t1)$ has been convected by the temporal prediction proposal and the relative sizes of polybone $b_1(t1)$ have been allowed to vary independently in the subsequent hill-climbing. Moreover, the heuristic search process has initialized a new foreground polybone $b_2(t1)$ in the leg region. This process continues in the manner described above, generating a third foreground polybone $b_3(t2)$ (FIG. 17(C)), and a fourth foreground polybone $b_4(t3)$. Note that FIGS. 17(A) through 17(F) only show the best model from model framework $\mathcal{M}(t)$. For this practical example the maximum number of foreground polybones is set to four (i.e., $\overline{K}=4$), plus the background polybone (not specifically identified in the figures). A larger limit generates similar results, except small transient foreground polybones appear in many frames. FIGS. 17(D) through 17(F) indicate that a plausible model for the motion has been found, including (at times) the depth relation between the forearm (polybone $b_4$) and the torso (polybone $b_1$), as indicated in FIGS. 17(E) and 17(F).

Those of ordinary skill in the art will recognize that other heuristic search processes can be used in place of the process described above. For example, a deletion process may be used in which a polybone that, for example, accounts for only a small amount of data or is associated with an object that stops moving in some seed model $S_k(t)$ would be deleted to form an initial guess $G_{k-1}(t)$ with one fewer polybone. Also, a depth-reversal process may be used in which two overlapping polybones in some seed model $S_k(t)$ had their depth orders reversed to form the proposal $G_k(t)$. Notice that only the depth orderings of polybones whose occupancy maps overlap need be considered, since the relative depth of spatially disparate polybones does not affect the objective function $O(M)$. Indeed the depth ordering should be considered as a partial order relating only pairs of polybones which contain at least one common pixel with a nonzero occupancy weight.

Besides considering other types of heuristic search methods, another avenue for improvement of the visual motion analysis method of the present invention is to include an estimate for the value of the objective function $\mathcal{O}$ (G) associated with any initial guess B. A useful estimate for $\mathcal{O}$ (G) may be obtainable from low-resolution versions of the likelihood maps for the corresponding seed model S. Such an estimate could be used to select only the most promising proposals for subsequent hill-climbing. Such a selection mechanism is expected to be more important as the number of different types of proposals is increased.

Finally, a process for factoring the models into independent models for disparate spatial regions (i.e., where the polybones in the two regions do not overlap) is essential to avoid a combinatorial explosion in the model space for more complex sequences.

Figure 18A:
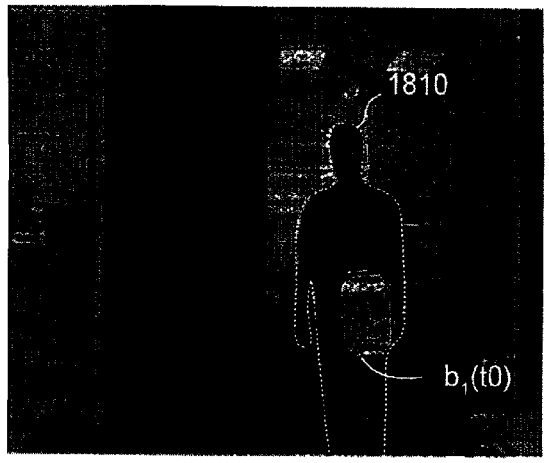
FIGS. 18(A) through 18(O) are a series of photographs depicting a third practical example of the visual motion analysis method of the present invention.
Figure 18B:
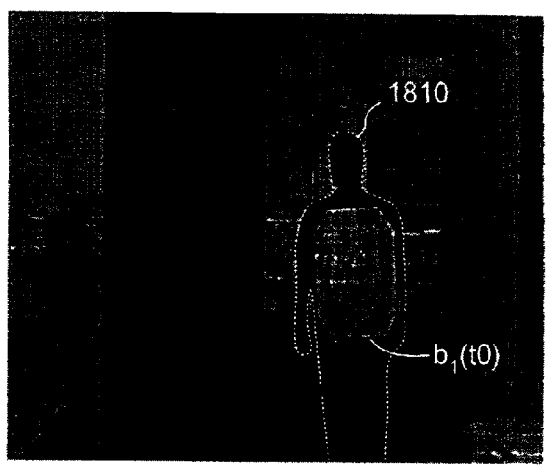
Figure 18C:
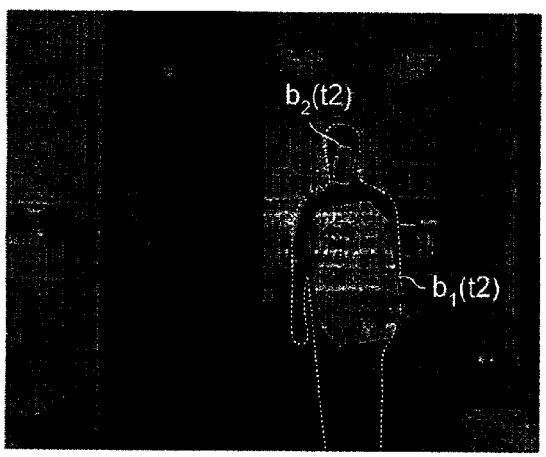
Figure 18D:
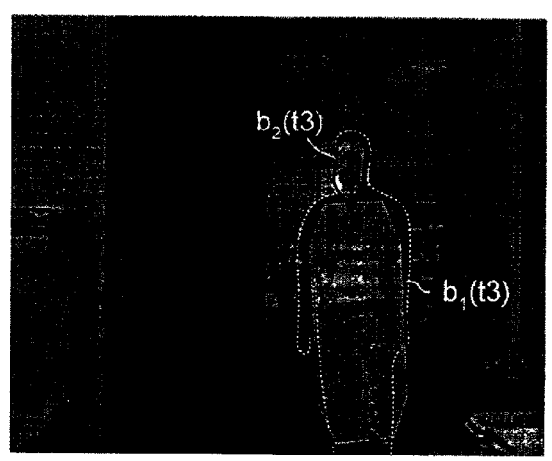
Figure 18E:
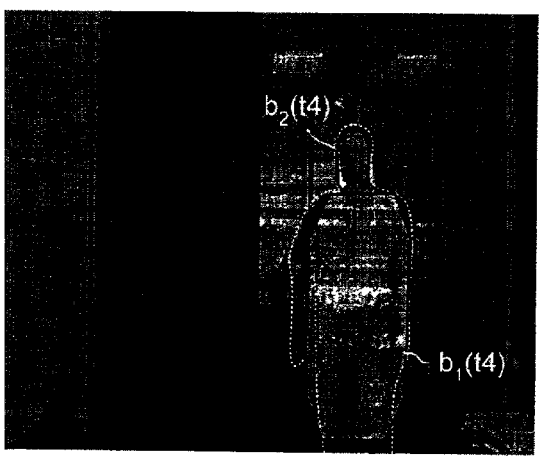
Figure 18F:
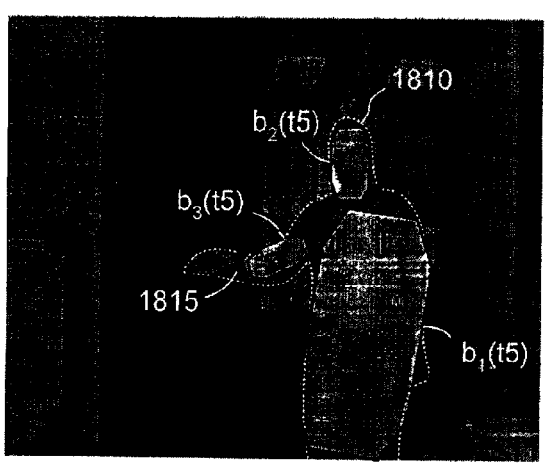
Figure 18G:
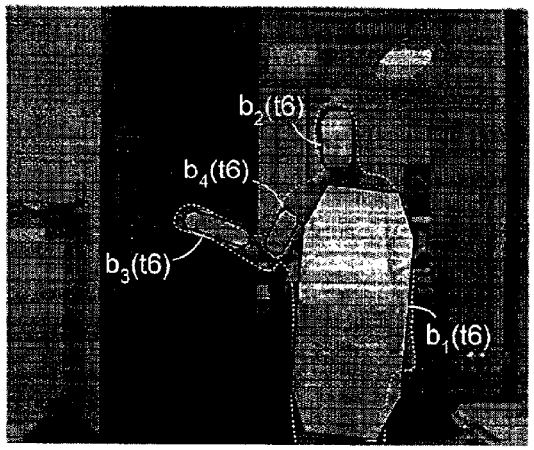
Figure 18H:
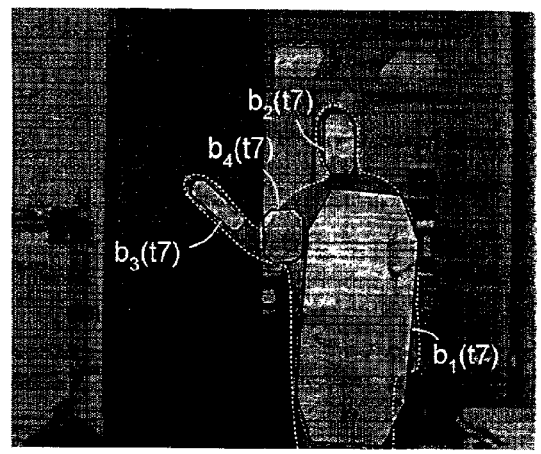
Figure 18I:
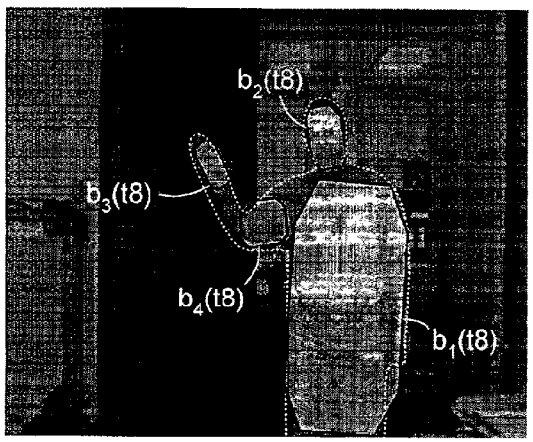
Figure 18J:
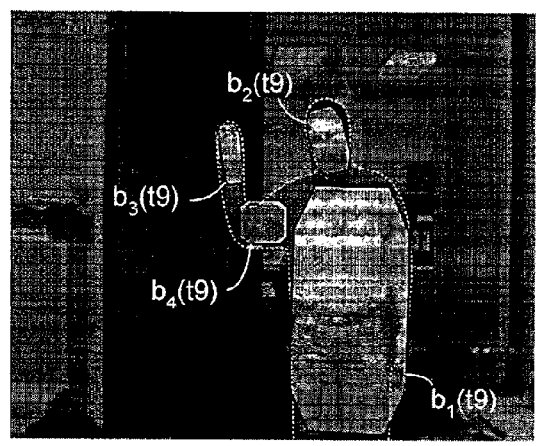
Figure 18K:
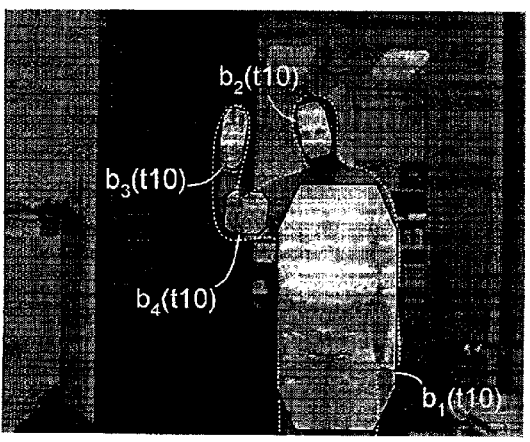
Figure 18L:
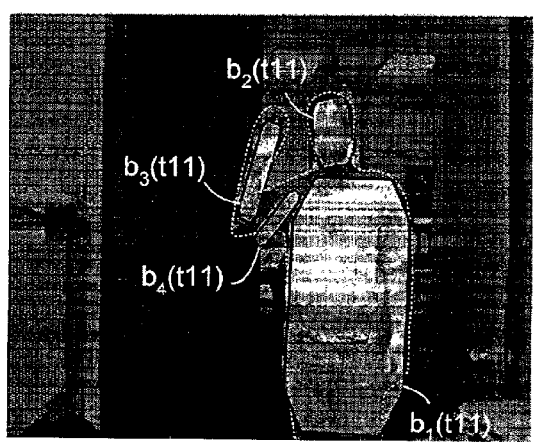
Figure 18M:
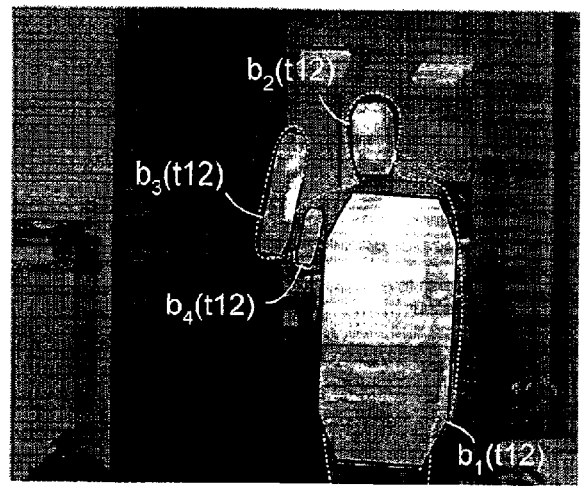
Figure 18N:
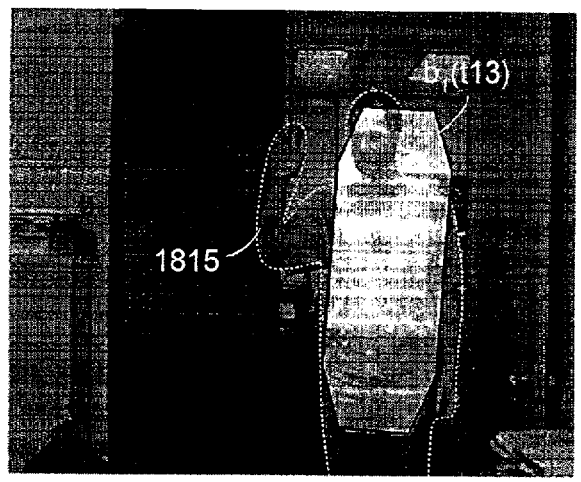
Figure 18O:

FIGS. 18(A) through 18(O) provide a series of images representing a second practical example illustrating the heuristic search process. In this sequence the subject 1810 is walking towards the camera, resulting in a relatively slow image motion. This makes the motion segmentation more difficult than in the practical example shown in FIGS. 8(A) through 8(G). To alleviate this every second frame was processed. FIGS. 18(A) through 18(E) shows the initial proposal and development of a global model including two foreground polybones b1 and b2. This two component model persisted until subject 1810 began raising his right arm 1815, as indicated in FIG. 18(F), when a third foreground polybone b3 is generated. As indicated in FIGS. 18(G) through 18(M), a fourth polybone b4 is generated that, along with third foreground polybone b3, models the articulated two-part movement of the subject's arm. Finally, as indicated in FIGS. 18(N) and 18(O), at the end of the sequence the subject is almost stationary, and the model framework eliminates all but the "core" model (i.e., the "best" global model includes zero foreground polybones because there is not detected movement).

Despite the limitations of the simple basic process used in the practical examples described above, the results of these practical examples indicate that: 1) the search for such simple models of image flow can be tractable; and 2) the best models produced and selected by such a heuristic search process can be of practical interest. In particular, for this second point, many of the image decompositions exhibited in the practical examples appear to be suitable starting points for the initialization of a simple human figure model.

Model Comparison

The prior p(M) in the objective function (equation (9)) serves two purposes. First, it may encode a bias in the continuous parameters of model M being fit, such as the overall size $s_x$, $s_y$ parameters of a polybone, the deviation of a polybone shape from that in a previous frame, the overall magnitude of the motion, or the deviation of the motion parameters from the previous frame. Such a bias is particularly important in cases where the data is either sparse or ambiguous. Given sufficient unambiguous data, the likelihood term in equation (9) can be expected to dominate the prior.

The second purpose of p(M) is to complete the definition of what is meant by a "best" (i.e., more plausible) model, which is used during the search for models as described above. Without a prior in equation (9) it is expected that more complex models, such as models with more polybones, could achieve higher likelihood values, since they have extra degrees of freedom to fit to the data. Thus, the maximum of the objective function for a particular number of polybones is monotonically increasing (non-decreasing) in the number of polybones. Beyond a certain point, the increase is marginal, with the extra polybones primarily fitting noise in the data set. However, without the prior p(M) the model selection process would consistently select these over-fitted models as the best models. In order to counteract this tendency there must be some incremental cost for successively more complex models. Here, this cost is determined by the selected prior p(M). Specifically, -log p(M) is the cost due to model complexity used in the objective function (equation (9)).

The prior distribution referred to above is a product of simple terms, which will now be described. First, all the polybones are considered to be independent, so if M has K foreground polybones, with parameters $b_k$, then $$p(M) = \prod_{k=0}^{K} p(b_k), \tag{19}$$

where $p(b_k)$ is the prior distribution for the $k^{th}$ polybone. Also, as described next, the prior $p(b_k)$ is itself taken to be a product of simple terms.

First, in order to control the overall size of each foreground polybone, a prior on the size parameters of the form $p_1(s_x)p_1(s_y)$ is used, where $$p_1(s) = \begin{cases} \lambda_s e^{-\lambda_s(s-s_0)}, & \text{for } s \geq s_0, \\ 0, & \text{for } s < s_0. \end{cases} \tag{20}$$

Here, $s_0$=1 (in pixels) is the minimum for $s_x$, $s_y$, and $\lambda_s$=1. This prior provides a bias towards smaller polybones, and is useful during hill-climbing to avoid having the foreground polybones grow into uniform image regions.

In addition to the size prior, a smoothness prior is used on the pose of the foreground polybones. More precisely, for any given polybone, let $q_{t-1}=(s_{t-1}, \theta_{t-1}, c_{t-1})$ denote its optimal pose parameters found at time t−1. Similarly, let $\tilde{q}_t=(\tilde{s}_t, \tilde{\theta}_t, \tilde{c}_t)$ denote the same pose parameters convected forward to time t, using the flow computed between frames t−1 and t. Then the conditional prior over $q_t$, given $\tilde{q}_t$, is taken to be Gaussian with mean $\tilde{q}_t$. That is, $$p_2(q_t|\tilde{q}_t)=N(s_t;\tilde{s}_t,\Sigma_s)N(\theta_t;\tilde{\theta}_t,\sigma_\theta^2)N(c_t;\tilde{c}_t;\Sigma_c) \tag{21}$$

where N(x; $\mu$, $\Sigma$) is a Normal density function with mean $\mu$ and covariance $\Sigma$. In the current experiments $\Sigma_s=\Sigma_c=p^2\sigma^2_s I$ (where I is the 2×2 identity matrix) was used, with $\sigma_s$=4 denoting the polybone width and p=½. The standard deviation $\sigma_\theta$ was chosen to be scaled by the radius of the convected polybone, say $r(\tilde{s}_t)$. In this instance, $\sigma_\theta=p\sigma_s|r(\tilde{s}_t)$ was used.

The term $p_2(q_t|\tilde{q}_t)$ (see equation 21) in the prior coerces the shapes of the foreground polybones to vary smoothly over time. When a polybone is first initialized, a shape is selected, but this shape is not expected to be close to the fitted shape. To allow for a rapid initial pose change, $p_2(q_t|\tilde{q}_t)$ is applied only for t>$t_0$ where $t_0$ is the first frame at which the hill-climbing converged to a pose with $s_x$ and $s_y$ unclamped.

The prior $p_1(s_x)p_1(s_y) p_2(q_t|\tilde{q}_t)$ contains the only continuously varying terms. A slow and smooth prior on the motion parameters within the polybones could be applied in a similar manner. These continuously varying terms bias the hill-climbing stage towards smaller foreground polybones, which vary smoothly in time.

As mentioned above, the second purpose for the prior p(M) is to control the model selection process. In particular, the increase in the data log likelihood obtained by adding a new foreground polybone should be larger than the decrease in the log prior due to the new model. There are many ways to formulate a penalty on model complexity. One popular approach is Bayesian model selection (see "Bayesian Interpolation", D. J. C. MacKay, Neural Computation, 4:415–447, 1991). A simpler approach is described below, which represents one possible embodiment. The general idea for estimating a prior $p(b_k)$ on each polybone according to this embodiment is to assume that each of the parameters have been resolved to some accuracy, and that neither the data likelihood nor the prior vary significantly over the resolved parameter set. If this assumption holds, then the unnormalized posterior probability of selecting a model from within this resolved set can be approximated by the product of the data likelihood, the value of continuous prior density, and the volume of the resolved set of polybone parameters. This is equivalent to using a prior p(M) in equation (9) that includes these volume terms from the resolved parameter set. This simple approach is followed below.

Given this general motivation, the following constant terms are included in the product forming the prior p(b) for an individual foreground polybone. First, both the center location and the sizes are assumed to be resolved to $\pm\sigma_s$ over a possible range given by the entire image. The corresponding volume term is $$p_{c,s} = \left[\frac{2\sigma_s}{n_x}\frac{2\sigma_s}{n_y}\right]^2, \quad (22)$$

where $n_x \times n_y$ is the size of the images in the sequence. Second, $\theta$ is assumed to be resolved by an amount that depends on the radius r of the polybone. In particular, $r\theta$ was resolved to within $\pm\sigma_s$. Since the shape we use is symmetric under rotations of 90 degrees, the volume term for $\theta$ is $$p_\theta = \frac{2\sigma_s}{r\pi/2} = \frac{4\sigma_s}{\pi r}. \quad (23)$$

Similar volume terms are required for the motion parameters. These include an inlier mixing proportion assumed to be resolved to ±0.5 out of a possible range of [0,1]. This gives a volume term of $$p_m = \frac{1}{10}.$$

In addition, the inlier flow model includes an estimated standard deviation, $\sigma_v$, for the inlier motion constraints. We assume that $\sigma_v$ is resolved to within a factor of 2 (i.e., $\pm\sqrt{2}\sigma_v$), and that the prior for log($\sigma_v$) is uniform. The minimum and maximum values for $\sigma_v$ were taken to be 0.1 and 2.0 pixels/frame. This then provides a volume term of $$p_{\sigma_v} = \frac{2\log(\sqrt{2})}{\log(2.0) - \log(0.1)} = \frac{\log(2)}{\log(20)}.$$

Finally, the translational velocity was assumed to be resolved to $\pm\sigma_v$ over a possible range of [−5,5]. The volume term for this is $$p_v = \frac{2\sigma_v}{10}.$$

This completes the constant terms in the polybone prior p(b).

In summary, the prior for a foreground polybone, p(b), is product $$p(b) = p_1(s_x)p_1(s_y)p_2(q|\tilde{q})p_{c,s}p_\theta p_m p_{\sigma_v} p_v. \quad (24)$$

Clearly, equations (19) and (24) provide only a rough approximation of a suitable prior p(M). More detailed techniques could be used for approximating how well the various parameters are estimated (see, for example, "Estimating the Number of Layers in a Distribution using Bayesian Evidence and MDL", T. F. El-Maraghi, unpublished manuscript (www.cs.toronto.edu/tem/mup.ps), 1998), or for estimating the unnormalized posterior probability mass in the peak near the current model M (see "Bayesian Interpolation", D. J. C. MacKay, Neural Computation, 4:415–447, 1991).

The present inventors believe that the rough approximation set forth above is sufficient for many basic applications of the present invention. One reason for this is that the data likelihood term itself only provides a rough approximation, since the data terms D(x) representing the motion constraints are correlated. In particular, the data items D(x) are obtained by subsampling the G2–H2 filter responses at ¼ of the wavelength for the peak tuning frequency of the filters, and steering the filters to 4 equally spaced orientations. Therefore, significant correlations in the filter responses in 3×3 patches is expected, and also in neighboring orientations. To account for this correlation, a multiplicative factor of n=⅑ can be included on the data likelihood term in equation (9).

According to one further aspect of the present invention, despite the simplicity of the prior p(M), the system is capable of selecting an appropriate number of polybones. This is clearly demonstrated in the practical example shown in FIGS. 18(A) through 18(O). At the beginning of the sequence the motion is well explained by just two foreground polybones. In the middle, the system uses two additional foreground polybones in order to model the motion of arm 1815. Finally, at the end of the sequence the figure is essentially stationary, and indeed the system determines that the optimal configuration according to equation (9) is to use the background polybone alone (e.g., the "core" model $M_0$ from the example discussed above with reference to FIG. 9).

Note that no appearance model is used in the above examples, so any moving figure is lost as soon as it stops, or otherwise moves with the background. Similarly, despite the use of a smooth deformation prior on shape and pose of the polybones, the inventors have found that the polybones often tend to shrink out of occluded regions. One alternative embodiment addresses this issue by incorporating the WSL appearance model described in co-owned and co-pending U.S. patent application Ser. No. 10/016,659 (cited above), which was not used in any of the practical examples disclosed herein.

FIGS. 19(A) through 19(D) and 20 show a tracking sequence utilizing the visual motion analysis method of the present invention. The same configuration is used as for the previous examples except, due to the slow motion of the moving objects, processing is performed every few frames.

Figure 19A:
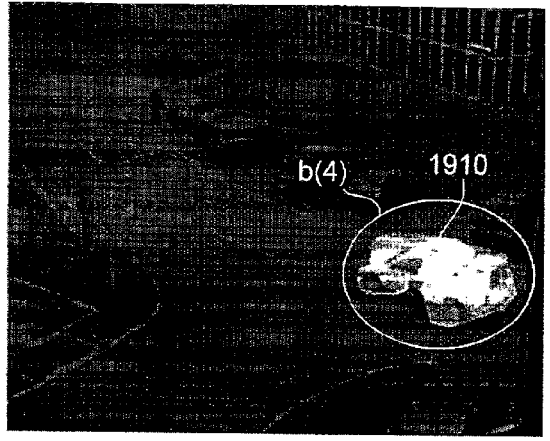
FIGS. 19(A) through 19(D) are a series of photographs depicting a fourth practical example of the visual motion analysis method of the present invention.
Figure 19B:
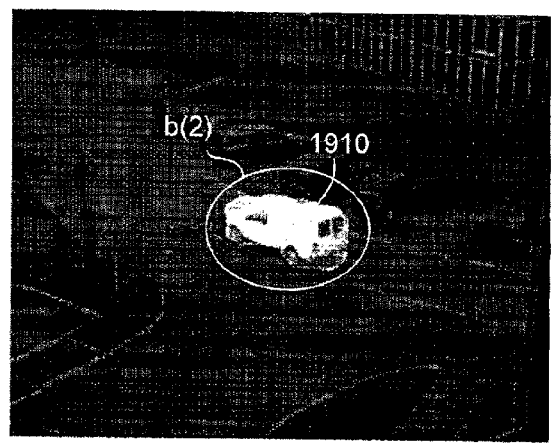
Figure 19C:
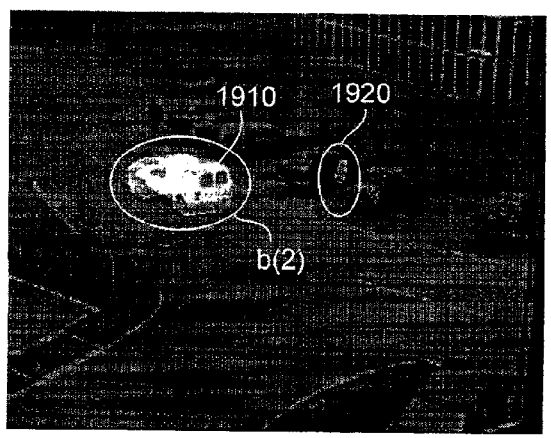
Figure 19D:
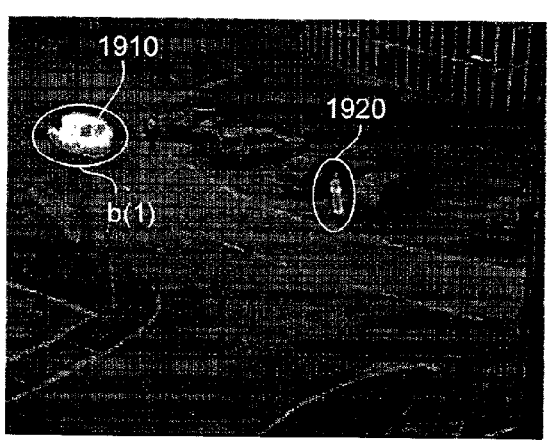

FIGS. 19(A) through 19(D) show a group of polybones b modeling the motion of a car 1910. The motion field for car 1910 involves some 3D rotation, which is enhanced by the fact that every fourth frame is processed. While the flow field for car 1910 might be approximated by an a fine model, a simple translational model does not simultaneously fit both ends of the car very well. Because the flow models in each polybone of the sequence are currently taken to be limited to translation and rotation (in the image plane), the system used several polybones to model the motion of car 1910. For example, shortly after car 1910 appears in the field of view (FIG. 19(A)), polybone group b includes four polybones to cover car 1910 (three of which can be easily seen in FIG. 19(A), the fourth is a tiny polybone on the roof of car 1910). By the time shown in FIG. 19(B), the system has found a presumably better model to cover car 1910 in which group b includes just two polybones. As indicated in FIG. 19(C), a global model including this two-polybone group b is considered the "best model" until car 1910 is almost out of view, at which time a global model in which polybone group b includes a single polybone is deemed optimal, as shown in FIG. 19(D).

The description of this flow on car 1910 in terms of multiple polybones indicates that a generalization of the flow models to include affine motion would be useful. It would be natural to include affine flow as an option to be selected during the optimization of equation (9). As described above, it would be necessary to charge a cost for the added complexity of using an affine flow model, in place of just translation and rotation. In addition, the convection of a polybone by an affine flow model would lead to a more complex shape model (i.e., additional pose parameters), which would also need to be charged. It would be a natural extension of the disclosed embodiments to impose these costs by elaborating the prior p(M) to include the prior for the affine motion or affine pose coefficients whenever they are selected.

The use of more general shape models is also motivated by the results in FIGS. 19(A) through 19(D). In particular, the outline of car 1910 could be modeled significantly better by allowing a free form placement of the eight vertices of the current polybones, or by allowing shapes with more vertices. The additional complexity of such models would again need to be controlled by incorporating additional terms in the prior p(M). However, note that at the current spatial resolution, it is not clear what the utility of such a higher fidelity spatial representation would be. The current model with just two foreground polybones appears to be sufficient for identifying the image region containing the motion.

Note that polybones are also assigned to pedestrian 1920 in FIGS. 19(C) and 19(D), which indicate that these pedestrians are also detected by the system. These additional polybones indicate the flexibility of the visual motion analysis method disclosed herein to track various sized objects, from relatively large polybones, such as those shown in FIGS. 8(A) through 8(G), to the small polybones used to identify pedestrian 1920 in FIGS. 19(C) and 19(D).

Figure 20:
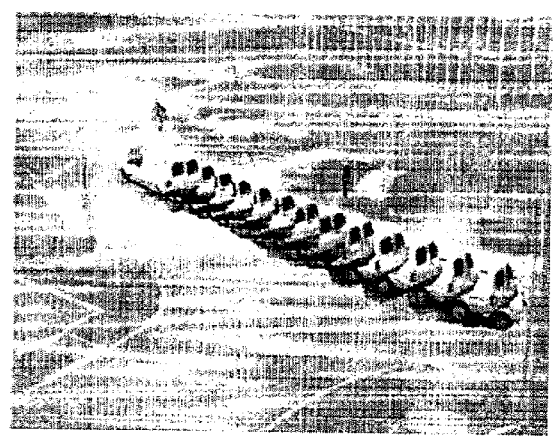
FIG. 20 is a composite photograph depicting an object tracked in accordance with another an embodiment of the present invention.

FIG. 20 is a composite image formed from complete sequence are shown in FIGS. 19(A) through 19(D). All of the extracted foreground polybones for the most plausible model have been displayed in FIG. 20. This composite image shows that the car is consistently extracted in the most plausible model.

The difficulty in segmenting slow image motion from a stationary background with a two-frame technique was the motivation for using every few frames in the practical examples provided above. It is expected that a multi-frame integration process in an appearance model, such as in the WSL-model (discussed above), will alleviate this problem. An alternative is to consider multi-frame motion techniques to resolve these slow motions.

Another difficulty arises when the magnitude of the motion or acceleration is too large. In particular, the polybone flow models included motions of up to 30 pixels per frame. For example, car 1910 enters the frame in FIG. 19(A) with a speed of roughly 30 pixels per processing frame (every 4 frames of the original sequence), and the initial proposal for a new polybone's motion is always zero. Similarly, the speed and acceleration of the lifting arm 1815 in FIGS. 18(F) through 18(M) is significant. In general, large magnitude motions and accelerations put a strain on the coarse to fine search used to fit the image motion parameters, especially within small sized polybones for which there may be limited coarse scale image information.

In order to cope with large motions and accelerations, and also objects that are occasionally completely occluded, a 'long range' displacement process can be included. Such a process would involve an appearance model within each polybone and a long range proposal process for determining the appropriate correspondences over time.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

What is claimed is:

1. A visual motion analysis method for analyzing an image sequence depicting a three-dimensional event including a plurality of objects moving relative to a background scene, the image sequence being recorded in a series of frames, each frame including image data forming a two-dimensional representation including a plurality of image regions depicting the moving objects and the background scene at an associated point in time, the method comprising:

identifying a first moving object of the plurality of moving objects by comparing a plurality of frames of the image sequence and identifying a first image region of the image sequence including the first moving object, wherein the first image region includes a central portion surrounded by an outer edge; and generating a layered global model including a background layer and a foreground component, wherein the foreground component includes exclusive spatial support region including image data located in the central portion of the first image region, and a probabilistic boundary region surrounding the exclusive spatial support region and including image data associated with the outer edge of the first image region.

2. The visual motion analysis method according to claim 1, wherein generating the layered global model comprises defining the exclusive spatial support region using image data associated with a closed-polygon shaped region of the central portion of the first image region.

3. The visual motion analysis method according to claim 2, wherein the closed polygonal shape is an octagon.

4. The visual motion analysis method according to claim 2, wherein the exclusive spatial support region is defined by size, orientation, and position parameters defining the closed-polygon shaped region.

5. The visual motion analysis method according to claim 1, wherein generating the layered global model comprises defining a width of the probabilistic boundary region according to image characteristics associated with the outer edge, wherein the width of the probabilistic boundary region is relatively wide when the outer edge is relatively blurred, and wherein the width of the probabilistic boundary region is relatively narrow when the edge region is relatively sharp.

6. The visual motion analysis method according to claim 1, wherein generating the layered global model comprises generating a plurality of foreground components, wherein each foreground component is assigned an explicit depth ordering relative to the other foreground components.

7. The visual motion analysis method according to claim 1, further comprising determining the visibility of each foreground component at each pixel of an image frame, wherein the visibility is determined by the depth orderings assigned to the plurality of foreground components.

8. The visual motion analysis method according to claim 7, wherein the visibility of a first foreground component at a first pixel is considered fully occluded when the exclusive spatial support region of a second foreground component having higher depth ordering includes the first pixel.

9. The visual motion analysis method according to claim 7,
wherein each foreground component is assigned an opacity value, and
wherein the visibility of a first foreground component at a first pixel is considered partially occluded when the exclusive spatial support region of a second foreground component having higher depth ordering includes the first pixel, and when the opacity value of the second foreground component indicates that the object assigned to the second foreground component is partial transparency.

10. The visual motion analysis method according to claim 1, wherein generating the foreground component further comprises forming an appearance model including image data from the first image region, and forming a motion model by calculating movement of the first image region over two or more frames of the image sequence.

11. The visual motion analysis method according to claim 10, wherein the appearance model is a WSL appearance model.

12. The visual motion analysis method according to claim 1, wherein the background layer includes a background appearance model including image data associated with regions of the image sequence depicting the background scene.

13. The visual motion analysis method according to claim 12, wherein the background layer includes parameters associated with motion of the background appearance model in the image sequence.

14. The visual motion analysis method according to claim 1, wherein generating the layered global model comprises defining the exclusive spatial support region using image data associated with one of: a spline shaped portion of the first image region, a portion of the first image region having a shape defined by harmonic bases, and a portion of the first image region defined by level-sets of implicit polynomic functions.

15. A visual motion analysis method for analyzing an image sequence depicting a three-dimensional event including a plurality of objects moving relative to a background scene, the image sequence being recorded in a series of frames, each frame including image data forming a two-dimensional representation including a plurality of moving image regions, each moving image region depicting one of the moving objects at an associated point in time, each frame also including image data associated with the background scene at the associated point in time, the method comprising:

generating a plurality of layered global models utilizing image data from the image sequence, each layered global model including a background layer and at least one foreground component, wherein each foreground component includes exclusive spatial support region including image data from a central portion of an associated moving image region, and a probabilistic boundary region surrounding the exclusive spatial support region and including image data including an outer edge of the associated moving image region;

refining each foreground component of each layered global model such the exclusive spatial support region of each foreground component is optimized to the image data of the moving image region associated with said each foreground component; and ranking the plurality of layered global models and identifying a layered global model that most accurately models the image data of the image sequence.

16. The visual motion analysis method according to claim 15, further comprising identifying the plurality of moving objects by comparing image data from a plurality of frames of the image sequence and identifying outliers.

17. The visual motion analysis method according to claim 15, wherein generating the plurality of layered global models comprises selecting a moving object from the plurality of identified moving objects, and generating a layered global model having a foreground component assigned to the selected moving object.

18. The visual motion analysis method according to claim 15, wherein generating the plurality of layered global models comprises generating a seed model having a seed background layer, and spawning a next-generation layered global model by identifying a selected moving image region in the seed background layer, assigning a new foreground component to the selected moving image region, and forming the next-generation layered global model by combining the seed model and the new foreground component.

19. The visual motion analysis method according to claim 18, wherein a size of the new foreground component is initially limited to a predefined initial amount of image data.

20. The visual motion analysis method according to claim 19, wherein subsequent refining of the new foreground component to fit the image data associated with the selected moving object region is restricted such that an increase from the initial amount is limited to a predetermined rate for a given time period.

21. The visual motion analysis method according to claim 15, wherein generating the plurality of layered global models comprises generating, for a selected global model, a plurality of foreground components, wherein each foreground component is assigned an explicit depth ordering relative to the other foreground components.

22. The visual motion analysis method according to claim 15, wherein refining each foreground component of each layered global model comprises using a "hill climbing" method to optimize parameters of each foreground component to the image data of the associated moving image region.

23. The visual motion analysis method according to claim 22, wherein refining each foreground component comprises differentiating a likelihood function with respect to pose parameters of said each foreground component to determine how much a change in the pose parameter will affect a fitness value associated with the pose parameter, wherein the pose parameters include size, position, and orientation of the exclusive spatial support region.

24. The visual motion analysis method according to claim 22, wherein refining each foreground component further comprises utilizing a gradient-based search technique to determine whether a particular parameter change improves the fitness value.

25. The visual motion analysis method according to claim 22, wherein refining each foreground component is constrained such that changes to the parameter are limited to a predetermined amount per frame.

26. The visual motion analysis method according to claim 15, wherein ranking comprises utilizing a Bayesian model selection criterion that determines the fit of each foreground component parameter to the image data of the associated moving object region.

27. The visual motion analysis method according to claim 15, wherein ranking comprises utilizing a likelihood function that is biased to penalize complexity such that a first layered global model having a relatively low number of foreground components is ranked higher than a second layered global models having a relatively high number of foreground components when the fitness of the first and second layered global models is otherwise equal.

28. The visual motion analysis method according to claim 15, further comprising eliminating low ranking global models from the plurality of layered global models after ranking is performed.

29. The visual motion analysis method according to claim 28, wherein eliminating low ranking global models comprises eliminating all but one layered global models for each group of layered global models having an equal number of foreground components.

30. The visual motion analysis method according to claim 28, further comprising repeating the generating, refining, and ranking procedures for each sequential selected frame of the image sequence.

31. A visual motion analysis method for analyzing an image sequence depicting a three-dimensional event including a plurality of objects moving relative to a background scene, the image sequence being recorded in a series of frames, each frame including image data forming a two-dimensional representation including a plurality of moving image regions, each moving image region depicting one of the moving objects at an associated point in time, each frame also including image data associated with the background scene at the associated point in time, the method comprising:
generating a plurality of layered global models utilizing image data from the image sequence, each layered global model including a background layer and at least one foreground component, wherein each foreground component includes exclusive spatial support region including image data from a central portion of an associated moving image region, and a probabilistic boundary region surrounding the exclusive spatial support region and including image data including an outer edge of the associated moving image region;
ranking the plurality of layered global models such that layered global models that relatively accurately model the image data of the image sequence are ranked relatively high, and layered global models that relatively inaccurately model the image data of the image sequence are ranked relatively low; and
eliminating low ranking global models from the plurality of layered global models.

32. The visual motion analysis method according to claim 31, further comprising identifying the plurality of moving objects by comparing image data from a plurality of frames of the image sequence and identifying outliers.

33. The visual motion analysis method according to claim 31, wherein generating the plurality of layered global models comprises selecting a moving object from the plurality of identified moving objects, and generating a layered global model having a foreground component assigned to the selected moving object.

34. The visual motion analysis method according to claim 31, wherein generating the plurality of layered global models comprises generating a seed model having a seed background layer, and spawning a next-generation layered global model by identifying a selected moving image region in the seed background layer, assigning a new foreground component to the selected moving image region, and forming the next-generation layered global model by combining the seed model and the new foreground component.

35. The visual motion analysis method according to claim 34, wherein a size of the new foreground component is initially limited to a predefined initial amount of image data.

36. The visual motion analysis method according to claim 35, wherein subsequent refining of the new foreground component to fit the image data associated with the selected moving object region is restricted such that an increase from the initial amount is limited to a predetermined rate for a given time period.

37. The visual motion analysis method according to claim 31, wherein generating the plurality of layered global models comprises generating, for a selected global model, a plurality of foreground components, wherein each foreground component is assigned an explicit depth ordering relative to the other foreground components.

38. The visual motion analysis method according to claim 31, further comprising refining each foreground component of each layered global model such the exclusive spatial support region of each foreground component is optimized to the image data of the moving image region associated with said each foreground component.

39. The visual motion analysis method according to claim 38, wherein refining each foreground component of each layered global model comprises using a "hill climbing" method to optimize parameters of each foreground component to the image data of the associated moving image region.

40. The visual motion analysis method according to claim 39, wherein refining each foreground component comprises differentiating a likelihood function with respect to pose parameters of said each foreground component to determine how much a change in the pose parameter will affect a fitness value associated with the pose parameter, wherein the pose parameters include size, position, and orientation of the exclusive spatial support region.

41. The visual motion analysis method according to claim 39, wherein refining each foreground component further comprises utilizing a gradient-based search technique to determine whether a particular parameter change improves the fitness value.

42. The visual motion analysis method according to claim 39, wherein refining each foreground component is constrained such that changes to the parameter are limited to a predetermined amount per frame.

43. The visual motion analysis method according to claim 31, wherein ranking comprises utilizing a Bayesian model selection criterion that determines the fit of each foreground component parameter to the image data of the associated moving object region.

44. The visual motion analysis method according to claim 31, wherein ranking comprises utilizing a likelihood function that is biased to penalize complexity such that a first layered global model having a relatively low number of foreground components is ranked higher than a second layered global models having a relatively high number of foreground components when the fitness of the first and second layered global models is otherwise equal.

45. The visual motion analysis method according to claim 31, wherein eliminating low ranking global models comprises eliminating all but one layered global models for each group of layered global models having an equal number of foreground components.

46. The visual motion analysis method according to claim 31, further comprising repeating the generating, ranking, and eliminating procedures for each sequential selected frame of the image sequence.

* * * * *